US012709342B2

(12) United States Patent
Cieslak et al.

(10) Patent No.: US 12,709,342 B2
(45) Date of Patent: Aug. 18, 2026

(54) SYSTEM AND METHOD OF ROBOT LOCOMOTION

(71) Applicant: BLADEBUG LIMITED, London Greater London (GB)

(72) Inventors: Christopher Robert Cieslak, London Greater London (GB); Matthew James Cocking, London Greater London (GB); Hasan Amin, London Greater London (GB); Aksat Shah, London Greater London (GB); Brodie Clark, London Greater London (GB)

(73) Assignee: BLADEBUG LIMITED, London (GB)

( * ) Notice: Subject to any disclaimer, the term of this patent is extended or adjusted under 35 U.S.C. 154(b) by 572 days.

(21) Appl. No.: 18/025,672

(22) PCT Filed: Sep. 10, 2021

(86) PCT No.: PCT/GB2021/052351
§ 371 (c)(1),
(2) Date: Mar. 10, 2023

(87) PCT Pub. No.: WO2022/053821
PCT Pub. Date: Mar. 17, 2022

(65) Prior Publication Data

US 2024/0025500 A1 Jan. 25, 2024

(30) Foreign Application Priority Data

Sep. 10, 2020 (GB) .................................... 2014278

(51) Int. Cl.
*B62D 57/024* (2006.01)
*B62D 57/02* (2006.01)

(52) U.S. Cl.
CPC .......... *B62D 57/024* (2013.01); *B62D 57/02* (2013.01)

(58) Field of Classification Search
CPC ............................ B62D 57/024; B62D 57/02
See application file for complete search history.

(56) References Cited

U.S. PATENT DOCUMENTS

| | | | | |
|---|---|---|---|---|
| 5,136,201 | A | 8/1992 | Culp | |
| 11,959,463 | B2 * | 4/2024 | Cieslak | F03D 17/00 |
| 2024/0025500 | A1 * | 1/2024 | Cieslak | B62D 57/032 |

FOREIGN PATENT DOCUMENTS

| | | |
|---|---|---|
| CN | 105151157 A | 12/2015 |
| CN | 103998186 B | 12/2016 |

(Continued)

OTHER PUBLICATIONS

Office Action dated Jul. 22, 2025, cited in corresponding Japanese Patent Appln. No. 2023-516495 with English translation.

(Continued)

*Primary Examiner* — Kevin Hurley
(74) *Attorney, Agent, or Firm* — BACON & THOMAS, PLLC

(57) ABSTRACT

A robotic device (300) for inspecting structures, comprising: a body (302) extending in a longitudinal direction of the robotic device (300), the body (302) having a front end (304), a rear end (306), and opposing sides (312), (314) extending between the front end (304) and the rear end (306); a plurality of legs (316) arranged on each of the opposed sides (312), (314) of the body (302), each leg (316) comprising one or more joints; and a plurality of carriages (315), each carriage (315) connecting a leg (316) to the body (302) and being configured to allow each leg (316) to translate in a longitudinal direction relative to the sides of the body, and wherein each of the carriages (315) is configured to move independently of each of the other carriages such that a leg separation may be varied, the leg separation being the distance between any two adjacent legs on one side of the body.

20 Claims, 21 Drawing Sheets

(56) References Cited

FOREIGN PATENT DOCUMENTS

| | | | | | |
|---|---|---|---|---|---|
| CN | 105050776 | B | | 12/2017 | |
| CN | 207345970 | U | | 5/2018 | |
| CN | 109178131 | A | | 1/2019 | |
| CN | 208439335 | U | | 1/2019 | |
| CN | 109696824 | A | * | 4/2019 | ............... G05B 9/03 |
| CN | 109746928 | A | | 5/2019 | |
| CN | 209904907 | U | | 1/2020 | |
| CN | 110775179 | A | | 2/2020 | |
| CN | 111332382 | A | | 6/2020 | |
| GB | 2573192 | A | | 10/2019 | |
| JP | 2003-062771 | A | | 3/2003 | |
| TW | I305508 | B | | 1/2009 | |
| WO | WO2013/032166 | A2 | | 3/2013 | |
| WO | WO-2022053821 | A1 | * | 3/2022 | ........... B62D 57/032 |

OTHER PUBLICATIONS

ISR cited in International Appln. GB2014278.2 dated Feb. 16, 2021.

Transmittal of ISR & Written Opinion cited in Int'l Appln. PCT/GB2021/052351 dated Dec. 20, 2021.

Office Action dated Jun. 23, 2025, in corresponding Chinese Appln. No. 202180075452.4 with English translation.

Search Report in corresponding Taiwan Appln. No. 110133637 dated Sep. 1, 2025.

Office Action.

* cited by examiner

SYSTEM AND METHOD OF ROBOT LOCOMOTION

FIELD

The present specification relates to a system and method of locomotion for a robot, particularly, but not exclusively, for robotic devices that are configured to move across structures to perform inspection and/or maintenance operations.

BACKGROUND

Robots configured to traverse large structures such as wind turbines, skyscrapers, bridges, and nuclear power station cooling towers are known. An example of one such robot is disclosed in PCT/GB2019/050363.

Offshore turbines operate in harsh and extreme environments such as the North Sea. As wind turbine blades continue getting larger, their tip speeds can exceed 100 m/s. At these speeds, any particulates in the air, such as rain, dust, salt, insects, etc., can wear away the surface of the leading edge of a blade, a phenomenon known as leading edge erosion (LEE). This, in turn, alters the aerodynamic shape of the blade, affecting the efficiency and potentially exposing the blade to further and more serious damage, thereby reducing the life of the blade.

LEE is a key issue for the operations and maintenance in the offshore wind sector for other reasons as well. The subsequent loss of energy produced by the wind turbine, plus the cost of having unscheduled maintenance downtime should the erosion become more serious, directly affects the cost of the electricity produced, the amount of emissions that could be saved from reduced fossil fuel usage elsewhere in electricity generation, and the security of the supply to the customers.

Wind turbines, therefore, require regular inspection to check for damage, for example, from a bird strike or other object impact, as well as to monitor erosion, such as LEE, that can be caused by particulates such as sand or grit, but also by droplets of rain or salt water. Indeed, this is becoming a key issue for the offshore wind sector. As wind turbine blades are generally made of composite materials, if the erosion becomes excessive, then this can open up the core to possible ingress of moisture and subsequent delamination.

Further, whilst the mechanisms that cause LEE are not yet fully understood, it can be said that at some point, all wind turbine blades will suffer from some form or degree of LEE during their life, which will need to be addressed.

In addition, wind turbines are often located in remote places where there can be significant insect populations. As a result, there can be a build-up of debris, such as from dirt and particulates as well as insects, and this can affect the efficiency of the wind turbine over time. Regular cleaning can be beneficial to reduce this build-up and maintain blade efficiency.

Similar problems to LEE on wind turbines exist for other structures, in that regular maintenance is required and structures require surface inspections and repairs in places that are difficult and dangerous for human operators to reach.

Wind turbines 1, like the example illustrated in FIG. 1, are becoming a familiar sight on the landscape. They may be land-based wind turbines, or they may be based offshore, for example as part of a floating wind farm for generating electricity. It is predicted that by 2030, floating wind farms will become the norm, with significantly larger turbines generating over 15 MW of energy, compared to the 7 MW drivetrains today. As larger and larger blades 2 are used in the wind turbines, there is increasing reliance on lighter weight materials. The nature of these materials and the higher relative blade tip speeds, increases their susceptibility of their leading edge to damage.

Traditionally, the inspection, servicing and maintenance of wind turbine blades has been reactive. For example, it can take the form of ground-based photography with follow-ups using rope access technicians to look at defects identified in the photos. These technicians then carry out necessary remedial works either via rope or, more recently, working platforms installed around the blade. Recently, drones have started to replace ground-based photography to capture the initial inspection images and are proving to be a step in the right direction for regular inspection of blades.

BladeBUG's prior robotic device 10 is shown in FIG. 2. The robotic device could be used to proactively inspect the wind turbine blades 2 during other service downtime. Such a robotic device 10 is depicted in FIG. 2 to be moving along a leading edge 3 of a wind turbine blade 2.

The cost, and the dangers to which rope access technicians are exposed, in undertaking remedial work remain and increase significantly offshore. It would be desirable to allow these follow-ups to be carried out using advances in robotics to reduce the level of human intervention. In this way, it is possible to then utilise the limited number of skilled technicians more effectively, allowing more wind turbine blades 2 to be maintained.

The robotic device 10 could allow recording of detailed information about any LEE or other defects detected on the blades 2. The collected data can be transmitted to onshore-based specialist engineers for processing (together with the data from numerous other follow up inspections) and determination of any required remediation work. Early detection and treatment can be cheaper and faster and can minimise additional damage to the blades 2.

Various other solutions to structure inspection exist. Currently, for wind turbines, systems are in place which use drones with cameras or other detectors to identify damage to the blades as well as to the supporting structure, e.g., a mast. There have also been recent attempts, such as the one described above, to make robots that are able to scale the mast of a wind turbine for the purposes of inspection and maintenance. Some of these use electromagnets or suction devices to allow the robots to cling to the mast. Again, similar solutions exist for other large structures.

However, the robotic devices and their methods of locomotion that are currently available may offer limited ability to cope with some non-planar surfaces or edges of thin sections. Therefore, there is a need for improved robotic devices and methods of locomotion, for example, to allow such robotic devices to reach parts of structures for inspection and maintenance that previously could not be reached reliably.

SUMMARY

Viewed from a first aspect, the present invention provides a robotic device for inspecting and/or maintaining structures, comprising: a body extending in a longitudinal direction of the robotic device, the body having a front end, a rear end, and opposing sides extending between the front end and the rear end; a plurality of legs arranged on each of the opposed sides of the body, each leg comprising one or more joints; and a plurality of carriages, each carriage connecting a leg to the body and being configured to allow each leg to translate in a longitudinal direction relative to the sides of the body, and wherein each of the carriages is configured to move independently of each of the other carriages such that a leg separation may be varied, the leg separation being the distance between any two adjacent legs on one side of the body (as measured adjacent the body.

An advantage of the first aspect is that a robotic device has an additional linear degree of freedom in each leg from the use of a carriage that allows each leg, to translate in the longitudinal direction along one of the sides of the body in a way that can vary a leg separation with respect to an adjacent leg on a same side of the body. This may allow the robotic device to move faster and cope better with non-planar surfaces compared to existing robotic devices.

It has been found that the extra degree of freedom allows an improved range of movement and utility, particularly when the legs of the robotic device are fixed in place to a surface at their feet (e.g., through suction) and the surface involves a high degree of convex curvature or where the surface structure comprises parallel or substantially parallel surfaces that are similar in width to the robotic device, for example, a beam or edge of a beam, an edge profile of a floor or plate, a post, or any combination of these.

In these situations, one or more lower limb segments (limb segments closest to the feet) on one side of the robotic device can be angled between 90 to 180 degrees with respect to a corresponding lower limb segment for a leg on the opposite side of the body. As a result, when straddling a thin section as described above, upper limb segments may extend downwardly with respect to the body at a relatively steep angle to link a hip joint (coxa), from which the hip joint extends generally horizontally away from the side of the body, to the lower limb segment of the leg.

With regard to the ability for each carriage to translate in a longitudinal direction relative to the sides of the body, this means that each of the carriages are able to move in a forwards and back direction along the sides of the robotic device. This movement is irrespective of the shape of the robotic device, and of whether the sides are flat or curved. Thus a major component of the direction of translation of a carriage would be in the longitudinal direction of the robotic device (e.g., as the carriage follows any curvature of the body). One or more of the carriages may be configured to move in a direction having a component in a vertical direction relative to the body of the robotic device, as well as in the longitudinal direction.

The term "leg separation" may refer to the distance between any two adjacent legs or adjacent carriages on the same side of the body. That is, the physical distance between adjacent legs or carriages may vary. The "leg separation" may be determined at a location where the legs are connected to the carriages, for example, at a hip joint, so as to be determined at a position which is close to the body of the robotic device.

The following describes optional features that may be combined with the robotic device of the first aspect.

The robotic device may be configured to operate on a wind turbine, and more specifically on a wind turbine blade. In particular, the robotic device may be configured to walk/crawl along a leading edge of the wind turbine blade to conduct inspection and/or maintenance of the leading edge of the wind turbine blade. For example, the configuration of the legs (which may include its profile and dimensions) should be appropriate for allowing the robotic device to walk/crawl along the leading edge. Moreover, the robotic device may be programmed to recognise automatically the leading edge of the wind turbine blade and then control the movement of its legs autonomously such that it walks/crawls along the leading edge in a tip-wise or root-wise direction to perform the inspection and/or maintenance action.

The robotic device may be a multipod (in particular a hexapod, as will become apparent below) and resemble a robotic creature through comprising a body and a plurality of legs extending from each side.

The body may define a longitudinal axis along its length and may comprise a body length. In addition to a front end, a rear end, a left side, and a right side, the body may comprise a top side and an underside to define a substantially box-shaped body where the left side and the right side oppose one another. The left side and the right side may define flat sides of the body. However, the present invention is not limited to such a box-shaped body. The body of the robotic device may also comprise curved sides and/or rounded front or rear ends and/or a rounded top side or underside, or any combination of these.

The robotic device comprises one or more pairs of legs, wherein one leg of a pair of legs is arranged on an opposite side of the body widthways to the other. Such a leg may be moved independently of the leg on the other side of the body. Each leg may comprise two or more articulated limb segments. Articulations may provide a pivot at a hip and a knee of each leg. Each leg may comprise one or more rotational degrees of freedom, and optionally three rotational degrees of freedom. These rotational degrees of freedom may be provided by one or more of the articulations between limb segments.

Each leg may also comprise a foot wherein the foot of each leg may also be articulated, e.g., by way of an ankle joint. In this way, the foot may be configured to rest on a surface of the wind turbine blade or other structure in a substantially perpendicular manner to the surface of the structure.

The hip joint of each leg may be provided (at least in part) by one of the carriages such that each hip joint is able to translate along the side of the robotic device. The carriage may be guided through interaction with a guide provided on the body.

Each carriage may comprise a sliding interface configured to couple the leg to the guide, the carriage may further comprise an articulation configured to provide part of the hip joint and to join the carriage via the hip joint to an upper limb segment of the leg.

The surface may be any surface that the robotic device is configured to reach. In the example of a wind turbine, this may include any external part of the wind turbine and/or any internal surface, including an interior surface of a turbine blade. More particularly the surface may comprise two surface regions where the surface regions are generally opposed to each other on opposite sides of a structure, for example, where the robotic device may need to walk straddling the surface regions with one row of feet on one region and the other row of feet on the other region The robotic device may be configured to automatically walk and adapt to changing surface shapes. In the example of a wind turbine blade, the blade shape may change from a large cylinder at the root of the blade and transition to an aerofoil which may change in size and shape along a blade length to a blade tip. The curvature can vary from a high degree of convex curvature at a leading edge of a wind turbine blade to a lower degree of curvature as the robotic device walks to a trailing edge.

On other types of structure, the underlying surface that the robotic device has to walk on may be much more angular or comprise planar surfaces. For example, the structure may comprise an edge of a beam or the edge of a floor or plate where the opposing surfaces that the robotic device can grip on to (using suction) are parallel, planar surfaces (or substantially parallel, or substantially planar surfaces). Such surfaces may be spaced apart a distance that might correspond to roughly a width of the robotic device (e.g., corresponding to generally the width between the opposed hip/coxa joints of the robotic device, say, ±50%). Similar environments may be encountered when walking up or down posts, or working on structural ribs of an underside of a structure. The ability to walk on such terrain opens up the possibility for the robotic device to work on other types of structure that were not previously possible.

As indicated above, a distal end of each leg of the robotic device may comprise a foot, which in some embodiments may be a flat, curved or pointed end of a segment or limb, or more preferably may comprise a tool of some form to help the robotic device grip or secure itself to the surface of a structure.

The foot (e.g., an end effector) of each leg may comprise a suction device for securing the robotic device to the surface of the wind turbine blade or other structure. For example, the foot of each leg may comprise a suction cup. The suction cups may be in the form of concave suction cups, for example, having a radius to height ratio of greater than one. Alternatively, the suction cups may comprise a bellowed structure. Such a structure may be more adaptable to the curvature of the wind turbine blade. The suction cups should be made of a relatively compliant material, for example, a polymer-based material.

The legs are preferably configured (and a controller of the robotic device may be programmed) such that, in use, the feet approach the surface over which the robotic device is walking at an angle of 90°. That is, the foot approaches the surface in a direction that is perpendicular to the surface (or as close to perpendicular as feasible). In the case of a curved surface, the perpendicular direction may be defined from a plane tangential to the surface directly underneath a foot.

Each leg may comprise a suction generating device to generate suction within the suction cup. For example, this may be a device which comprises a piston to increase the internal volume of the cup and thereby lower the pressure within to create suction against the surface. The suction generating device may be located in the foot or mounted in or on a lower limb segment or other part of the leg. The device may comprise a servomotor, a hydraulic actuator and/or a pneumatic actuator.

In an alternative arrangement, the suction cup may be connected by a tube to a pneumatic or hydraulic supply. A pneumatic or hydraulic device may be placed in or on the body of the robotic device, or may optionally be located remote from the robotic device. That is, a pneumatic or hydraulic supply may be provided to the robotic device via an umbilical. An advantage of using an umbilical to provide utilities such as power, a pneumatic or hydraulic supply or any other supply that may be provided remotely would be that the robotic device itself may be lighter and may have a more compact design. Additional detail on a robotic device arrangement using an umbilical is provided below.

The foot may also comprise a blow-off device or function in order to exert a positive pressure to help the release of the foot from a surface.

The foot of each leg may also be sprung in such a way that the vacuum cup remains essentially perpendicular to the lower limb of the robot when it is not attached to a surface. In other words, when the robotic device is walking, the ankle joint will not move under self-weight or due to acceleration/deceleration forces (or external forces like wind loading) so that the vacuum cup can be positioned relatively squarely on the surface of the blade with each step. The spring force may be provided by compliance in the suction cup, a metallic or composite helical spring or by a Belleville washer/conical spring arrangement. The spring force may also be provided by a rubber or elastic polymer compression discs and/or tube arrangement, which is configured to restore the foot to a substantially perpendicular alignment with a lower part of the leg.

Each leg may comprise an upper limb segment (femur) and a lower limb segment (tibia). The upper limb segment may be connected to the lower limb segment by a lower articulated (knee) joint and the upper limb segment being joined to the body by an upper articulated (hip or coxa) joint. The upper articulated joint may provide one or two degrees of freedom to enable the leg to move forward and aft as well as up and down at this joint. Similarly, the lower articulated joint or a further articulated joint may provide one or two degrees of freedom to enable the leg to move in other ways.

Each articulated limb segment of the legs may be connected to an adjacent limb segment or the body by individually actuated, articulated joints. For example, each leg may comprise two articulated joints having an axis arranged in a direction that is substantially parallel to the longitudinal axis of the body (e.g., when the limb is arranged to extend perpendicularly from the body as viewed from above), and a further articulated joint arranged in a direction that is substantially perpendicular to the longitudinal axis of the body. The articulated joints described here may be the upper and lower articulated joints described above.

The foot of each leg may include an ankle joint which connects the foot to the lower limb section. The ankle joint may be articulated to allow at least two or optionally three degrees of movement in the ankle joint. The ankle joint may be articulated to alloy quasi-degrees of freedom, meaning that the joint may comprise resilient materials to allow a small amount of additional rotational movement or include a mechanism which can move by small amounts in linear directions, these measures helping the robotic device to accommodate unevenness of a surface when placing the foot of a leg.

In addition to pivotal movement or alternatively, the ankle joint may allow axial and rotational movement of the foot relative to the rest of the leg. This may enable the foot to allow twisting movements of the leg relative to the plane of the blade surface. An advantage of providing axial movement of the foot relative to the leg in addition to rotational movement is that the foot may rest on the surface of the wind turbine blade (and fix itself firmly to the surface) in a substantially perpendicular manner and allow rotation to enable the leg and body of the robot to move where necessary whilst the foot remains stationary and fixed to the blade.

The robotic device may be a hexapod. That is, the robotic device may comprise three pairs of legs, i.e., three legs on each of the left and right sides of the body. Alternatively, the robotic device may be a quadruped, octopod, or may comprise any number of legs (including odd numbers of legs) suitable for the application of the robotic device. The legs may not necessarily be all the same length and/or be joined to the body at the same height. The sides of the robotic device may not be parallel and the position and/or geometry of the legs may be adjusted accordingly.

The position of the carriages may define a line that is straight when the robotic device is viewed from a side. In other words, the carriages may all be able to translate along a side of the body at a constant height. The carriages may be seen to translate in a linear fashion when viewed from the side.

When viewed from above, the carriages of each side may be seen to translate in a linear manner. The sides of the body may be planar to facilitate this. For example, the carriages may translate along rails provided on the sides of the body that are straight.

In alternative embodiments, the sides of the body may be curved and the translation of the carriages may follow a curved path in a longitudinal direction or broadly longitudinal direction.

A guide may be provided on each side of the body. Each guide may be in the form of a rail or a pair of rails, for example, an upper and a lower rail. By providing an upper rail and a lower rail, the mounting of each leg e.g., via a sliding interface, can be at vertically spaced apart points, which provides better transmission of the loads from the body to the leg and a more stable configuration. The sliding interface may comprise a pair of linear bearings for engagement with the rails of one of the guides.

The body may comprise a left-handed guide associated with the left side of the body and a right-hand guide associated with the right side of the body. Each guide may comprise at least one rail which extends in the longitudinal direction along the body, optionally including an upper rail and a lower rail, as discussed above. These rails may extend in a parallel manner in the longitudinal direction and may be provided by the same structural element. In embodiments, the body may have a curved shape, meaning that the rails may be curved to follow the shape of the body. The plurality of carriages on a given side of the body may be connected to the rail or rails to guide the movement of each carriage as the carriage translates along a side of the body.

The rail or rails on each side of the body may be in the form of linear rails. The rail or rails may extend substantially the full body length of the robotic device, from a point proximate the front end of the body to a point proximate the rear end of the body. Each rail may comprise a projection or a recess that the sliding interface can engage with to guide the carriage in its translating movement.

The left side and the right sides may be flat sides, and the left-hand and right-hand guides may be provided on and extend along those flat, left and right sides of the body respectively. In this way the configuration of the sliding interface can be kept relatively simple and the top side and underside are kept free for mounting other components.

In other embodiments, the carriage of each leg may comprise a U-shaped bracket providing a sliding interface which extends from the top side to the underside of the body around the left or right side of the body, to be guided by rails on the top side and underside as the leg translates along a side of the body. The carriage of each leg could also comprise an L-shaped bracket which extends from one of the top side and underside to the left or right side of the body, to be guided by rails on either the top side or the underside and on the left or right side as the leg translates along a side of the body. The robotic device could also comprise a combination of such mounting and guiding arrangements, with some legs using one arrangement and other legs using another.

Each of the left side and the right side of the body may be provided with a mechanism or part of a mechanism to drive the translation of each leg along a side of the body of the robotic device. For example, the body may comprise a mechanism in the form of an actuator that is configured to displace a given leg along the body. More preferably, each leg is provided with an actuator which interacts with part of the body to displace the leg along the body, to create the translating movement and provide the additional linear degree of motion. Thus, each carriage may be in the form of a powered carriage, having its own source of power and drive.

Each of the left side and the right side of the body may comprise a gear rack extending along the length of the robotic device, for example, a linear gear rack. The gear rack may be oriented such that its gear teeth point in a substantially vertical direction relative to the body, e.g., as seen when the robotic device is standing on a horizontal surface. The gear teeth may face upwards or downwards on the gear rack. The gear rack may also comprise recesses or holes, rather than gear teeth, for engagement by sprocket teeth of a gear. Preferably the gear racks provided on each side of the body face in the same direction. Each side may comprise two gear racks, one arranged above the other.

Other arrangements for providing linear motion to one or more of the legs may include the use of a belt drive or the use of lead screws.

With such arrangements, the carriages may be seen to extend substantially all in a plane (a generally horizontal plane), and gear teeth of the gear rack may extend at generally right angles to that plane (and/or perpendicular to an axis of the body).

One or more of the carriages may comprise a motor and a gear. The gear may be mounted on a motor axle of the motor and driven directly by the motor. Alternatively the gear may be provided by part of a rotor of a hub motor. The gear may comprise a spur gear. The gear may be configured to engage the gear rack, for example, the plane of the gear may be substantially vertical and the teeth of the gear may interlock with the teeth of the gear rack. The motor may be configured to rotate the gear such that, in use, the gear translates linearly along the gear rack, and thus linearly along one of the left or right sides of the body. In this way, a carriage may be capable of translating (linearly) along the length of the body of the robotic device, or at least as far as the gear rack will allow. The gear rack preferably extends more than 75% of the body length of the robotic device, and more preferably more than 90% of the body length. Even with the presence of the other legs and carriages, a given carriage may be able to translate 60% of the body length of the robotic device.

The motor may comprise a position control, such as an encoder, in order to determine the position of the leg or carriage it is associated with along the length of the body. The motor for translating the carriage may be housed within the carriage.

In the case of the hexapod robotic device, each one of the six legs is connected to an associated carriage, and each carriage may have a motor and gear arrangement described above. Each of the six carriages may be connected to the body and guided in its movement by a guide such as a rail, preferably two rails, arranged above and below of a gear rack. Each of the six carriages may be configured to move independently with respect to another. That is, each carriage may, independently, move along the length of the gear rack to the extent there is room to do so. Other leg and carriage configurations are also contemplated, in particular, robotic devices comprising more than six legs and carriages.

While the body may comprise a gear rack and/or rail for each carriage such that each carriage may move along the whole length of its corresponding gear rack, and, optionally, the carriages along one side of the body share a common gear rack and a common rail or set of rails. Where more than four legs and carriages are present, i.e., more than two legs and carriages per side, some of the carriages on a given side may use one rail and/or rack set up and other carriages may use another.

One of the body or the carriages may comprise one or more limit switches configured to prevent the collision of any two carriages on a common gear rack. One or more of the limit switches may be configured to locate the positions of each of the carriages along a side of the body. The position of a carriage may be assessed relative to the body or relative to adjacent carriages, or both.

The upper articulated joint may be configured to have two degrees of freedom, such that the leg may be configured to rotate in a vertical plane to lift up from or down onto a surface and may be configured to rotate in a horizontal plane such that the leg rotates in order to swing the leg of the robotic device, for example, during walking or steering.

An advantage of allowing translation of the carriage along a side of the body as described above is that the translating movement of the legs, especially a linear translating movement, allows for a more appropriate stride style when moving along a curved surface, and in particular a convex curved surface like a leading edge of a wind turbine blade, where the movement may be in a radial direction of the wind turbine blade and the legs are engaging on opposite sides of the blade. It may result in faster movement of the robotic device along such surfaces with the robotic device being more sure-footed. Such a method of locomotion may also help the robotic device to walk along an edge of a floor, plate or beam, or other similar comparatively narrow structure, where the legs of the robotic device are engaging on opposed parallel or substantially parallel surfaces.

Some walking/crawling styles may be appropriate for flatter surfaces and some may be more appropriate for surfaces with more curvature or where the robotic device has to grip opposed sides of a structure, for example, from a high degree of curvature in the underlying structure like that of a leading edge of a wind turbine blade, or due to the thickness of the structure creating two parallel planar sides that the robotic device has to walk/crawl along like an edge of a beam, the edge of a plate or floor, or up/down a post. An advantage of providing an additional degree of movement though the provision of carriages for the legs is that it provides flexibility to optimise the walking style of the robotic device according to the conditions in hand. It may also allow better suction, and hence better grip, to be exerted by the robotic device to hold itself on a surface of a structure while walking or performing some other action.

Another advantage of this configuration is that the body of the robotic device may be able to move forwards and backwards with respect to the legs and/or the feet while the legs are fixed to a surface at their feet. This may be particularly advantageous in situations where the surface is slippery or weather conditions are dangerous, as it allows the feet to anchor more securely to the underlying surface while allowing sensors on the body to scan portions of the surface or underlying structure without having to move the legs; for example, to raster the surface, thus reducing a risk that the robotic device may slip and fall from the surface. Another situation may be that the robotic device may use the translation of the legs along the body to extend its body into spaces that are too small for it to walk into, thus allowing inspection of areas previously inaccessible to other robot configurations.

The translating motion may be achieved in a number of other ways to that of the gear and gear rack system described above in order to achieve the same result of forward motion on highly curved surfaces, as well as enabling it to walk on flat surfaces in the same manner. Other methods include: the use of driven lead screws to replace the gear rack; push rods or Bowden cables; pneumatically or hydraulically driven linear rails and/or actuators; and belt driven carriages to replace the gear rack. Other configurations may be envisioned by the skilled person.

The guide may be any physical feature that can guide the movement of the carriages as they translate along the body. It may be a feature which projects from or is recessed into the side of the body. It is preferably a feature that a linear bearing can work with to guide the translation of each carriage. The guide may also comprise a gear rack and provide a dual function of guiding and allowing translation.

Each leg may be a self-contained unit. That is, each leg may comprise its own power unit and may be detachable from the body. Any hydraulics or pneumatics needed by the leg may also be contained within the leg or may have a connection point for connecting hydraulic or pneumatic tubing to a supply from the body. Similarly, the leg may comprise a power cable for connecting to the body for the supply of electricity to the leg.

The legs may be modular and comprise identical components that are used on legs of the same row or on opposite sides of the body.

An advantage of a modular leg design would be to improve the ease of maintenance of the robotic device. By having removable legs, an engineer would be able to maintain each leg and the body separately. An additional advantage of the modular arrangement would be that if any one of the legs or the body were damaged, only that part would need to be replaced or sent for replacement and may allow for the use of backup body or leg parts to be used. This would have an added economic benefit of enabling users to purchase and store spare parts and perform relatively simple unit replacements themselves, for example, where each of the legs is the same.

An advantage of housing a power unit in each leg may be to enable the legs to function even if power is cut to the body. This may then enable the robotic device to travel to a safe location if a power cut to the body is detected. Additionally, if power to any one of the legs is lost or other malfunction is observed with a leg, the robotic device may remain functional under the power of its remaining legs.

The leg may be hollow. That is, the leg may have internal cavities in each of its upper and lower limbs so that power cabling and or hydraulic or pneumatic cabling may be housed within each limb of the leg. An advantage of this feature would be to provide protection to cabling inside the leg while reducing the risk of cables snagging on the structure being traversed by the robotic device. It also helps to reduce the angle that the cables are bent through during walking movements.

The robotic device may further comprise a battery housed in the body. The battery may be configured to supply primary power to the robotic device and/or may be used as a backup power supply in the arrangement that the robotic device is receiving power via an umbilical and that power supply is cut. The legs may include internal power supplies to power utilities within the legs.

The robotic device may comprise one or more cameras. Cameras may be arranged on a front, top or side region of the body, an underside of the body or on any of the legs. One or more of the cameras may be an inspection camera, for example, a high-resolution camera with the primary function of obtaining data indicative of the condition of the surface of the wind turbine blade or other structure. In addition to or alternatively, the same camera or another camera may be a navigation camera, to assist the robotic device in its movements across the surface of the wind turbine blade, and in particular along a leading edge of the wind turbine blade. One or more of the cameras may be a thermographic sensor, a laser scanner, a visible light camera, a hyperspectral camera for night vision, and/or a LI DAR sensor.

The robotic device may comprise a sensor array. The sensor array may be mounted on the body. The robot may comprise multiple sensor arrays mounted at different points on the body, for example on the top side, underside, front, back or left or right sides of the body, or even on the legs. The sensor array may comprise an ultrasound scanner for imaging the internal condition of a structure. The one or more sensor arrays may be configured to scan a surface of the structure. An advantage of providing one or more sensor arrays may be to allow improved mapping of surfaces around the robotic device, allowing a user to navigate the robotic device across structure with greater certainty. The sensor array may also provide improved information levels and detail about the structure, including surface conditions, defects, and information about the robotic device's environment to assist the robotic device's ability to navigate particular areas of the structure or surface.

The robotic device may comprise apparatus for repairing damage found on a wind turbine blade or any other composite structure. For example, the robotic device may comprise a chamber of resin with a device for applying the resin as a coating to a damaged region of the wind turbine blade. The resin may comprise two components and the robotic device may comprise two chambers, one for containing a first component and the other for containing a second component different to the first, wherein when the components are mixed together during the coating process it allows the mixed resin to harden. The resin may be, for example, an epoxy or polyester based resin or any other suitable resin. Alternatively, the resin may be a UV cured resin. The robotic device may further comprise a UV lamp which may be configured to cure a resin.

As an alternative or in addition to a resin tank, the robotic device may comprise a tank carrying material suitable to repair the structure that it is traversing. One example of a repair material may be stucco or concrete for the repair of buildings having a stucco or concrete exterior. The robotic device may also be used to transport and deploy coating materials, such as for hydrophobic coatings, sacrificial coatings, paints, lacquers and other such materials.

To apply resin, stucco, or other repair material, the robotic device may comprise a nozzle. The nozzle may extend from the body and may be guided either by a computer program or by a remote user to apply the repair material to the structure.

The robotic device may in addition to or as an alternative comprise apparatus for cleaning the structure. For example, for a wind turbine, the build-up of debris, e.g. insects, particularly along a leading edge of the wind turbine, can be a problem in terms of the operating efficiency of a wind turbine blade. The robotic device may be fitted with a chamber cleaning fluid and a nozzle for spraying cleaning fluid onto affected parts of the surface. The robotic device may further comprise a brush or scraper for removing debris from the surface of the wind turbine blade.

The robotic device may be free of any ancillary equipment. Alternatively, as mentioned above, an umbilical may be used to connect essential items, for example, power, pneumatic, hydraulic, data or other lines, to the robotic device. Thus, a connection for an umbilical may be provided on the body of the robotic device, the connection comprising contacts or ports for supplying the robotic device with power, a pneumatic line, data and/or hydraulic fluid. The pneumatic line, if present, may provide a source of suction for the feet and/or a supply of high-pressure air. The data connection may convey operating instructions to the robotic device as well as conveying inspection data back to a controller for transmission to a remote station where the data can be analysed.

The umbilical may also be configured to provide cleaning fluid or repair material, in addition to or in place of other lines mentioned above. There may be more than one umbilical.

Such an umbilical may be connected to the body in a position aligned with the longitudinal axis of the body in order to minimise any turning effects on the body through weight or wind loading. Optionally, the umbilical connects to a lower or underside portion of the robotic device's body. The umbilical may include a flexible portion or pivotal connection to minimise transmission of adverse lateral forces on the robotic device.

An advantage of having an umbilical is that the robotic device itself may be lighter and may have a more compact design if it does not have to carry resin tanks, batteries, hydraulic or pneumatic units or other containers for things that may be supplied from external storage units via the umbilical.

The robotic device may further comprise a controller configured to control the position of the body relative to the static feet, thus providing a stable platform to enable it to perform its inspection and/or maintenance actions with precision. The controller and actuators may provide the ability to have six axis computer numerical control (CNC) of the body relative to the blade surface.

Tools may be attached to the body, such as a surface grinder to allow the accurate removal of damaged material to a predefined shape and profile. Such repairs would facilitate a rope access technician with their work, minimising their exposure time on the surface of the wind turbine blade. The robotic device could carry out inspection of the underlying surface and/or inspection of the bulk material below, for example, using visual inspection techniques and ultrasound inspections. The robotic device could also carry out general routine maintenance such as cleaning, coating, sealing and/or painting surfaces. The robotic device could also carry out repairs by itself such as repairing cracks and/or damage caused to the surface, reinstating the leading edge profile back to the as designed and manufactured profile after leading edge erosion has taken place, etc.

The robotic device may be launched by a person or a small crane from the nacelle of the turbine by placing it on the root of the blade where it can then be manoeuvred to any part of the wind turbine blade to areas of interest or identified via a drone inspection to be damaged. It could also be dropped off onto a structure using a drone.

The robotic device may be used to crawl inside the wind turbine blade to carry out inspections and repairs in the small confined spaces within the blade structure. The robotic device may carry out lightning continuity and resistance tests to ensure that the lightning protection system is operating correctly.

The robotic device may also spray on surface coatings, such as super hydrophobic coatings to protect the blade surface and minimise dirt or water adhering. Applications of super hydrophobic coatings are potentially a method of reducing ice build-up on the blades of turbines in cold climates.

The robotic device may also inject/spray/apply resins to prevent additional environmental ingress into the blade structure.

Viewed from a second aspect, the present invention provides a method of locomotion for the robotic device of the first aspect, comprising: raising and lowering legs from and to a surface in a stepwise motion to move the body of the robotic device with respect to the structure, wherein the method of locomotion further includes translating each leg in a longitudinal direction along a side of the body when each leg is in a raised position.

An advantage of the second aspect is that a robotic device using a method of locomotion system of this kind may be better able to walk more controllably on surfaces exhibiting a high degree of convex curvature compared to existing systems, and the system may also allow an improved range of movement and utility.

The method of locomotion may include translating each carriage a distance representing 60% or more of a body length of the robotic device when the leg is in a raised position.

In one embodiment, the method of locomotion comprises: raising a first set of legs from a surface into an up position, the first set of legs comprising a left leg of a first pair of legs and a right leg of a second pair of legs, wherein the first pair of legs is adjacent to the second pair of legs; translating the first set of legs in the longitudinal direction; translating, with the first set of legs, the body in the longitudinal direction; lowering the first set of legs into a down position on the surface; raising a second set of legs from the surface into the up position, the second set of legs comprising a right leg of the first pair of legs and a left leg of the second pair of legs; translating the second set of legs in the longitudinal direction; translating, with the second set of legs, the body in the longitudinal direction; and lowering the second set of legs into a down position on the surface.

The legs may be translated by linear (or near linear) translation of the respective carriages to which the legs are attached. The translation may follow a straight path or may follow a curved path.

In another embodiment, the method of locomotion comprises: raising a first pair of legs from a surface into an up position; translating the first pair of legs in the longitudinal direction; lowering the first pair of legs into a down position on the surface; raising a second pair of legs from the surface into the up position, wherein the second pair of legs is adjacent to the first pair of legs; translating the second pair of legs in the longitudinal direction; lowering the second set of legs into a down position on the surface; moving the body in the longitudinal direction.

The method may include generating suction at a point of contact where a foot of the robotic device is in contact with the surface of the wind turbine blade. Suction might be applied to two or more feet of the robotic device that are in contact with a surface.

The method may comprise operating the legs of the robotic device so that the robotic device walks (crawls) along a leading edge of a wind turbine blade. The robotic device may walk from the root of the wind turbine blade (or close to the root) along the leading edge towards the tip of the wind turbine blade. It may even walk round the tip of the wind turbine blade, as well as over the remaining surface of the wind turbine blade.

The method may comprise walking along a beam or an edge of a beam. The method may comprise walking along an edge of a plate or floor. The method may comprise walking up or down such an edge or a post.

BRIEF DESCRIPTION OF THE FIGURES

Certain embodiments of the present invention will now be described in greater detail by way of example only and with reference to the accompanying figures in which.

DETAILED DESCRIPTION

The following description refers to the situation where the claimed robotic device is used for inspecting a wind turbine. However, the skilled person would be aware that the following disclosure may also be applicable to other structures such as skyscrapers, bridges, nuclear and other cooling towers as well as other structures which have hard-to-reach or dangerous areas for a human worker, or which have areas that are usually considered inaccessible areas for a human worker. Thus the robotic device described herein relates to any structure that requires inspection or maintenance.

Figure 1:
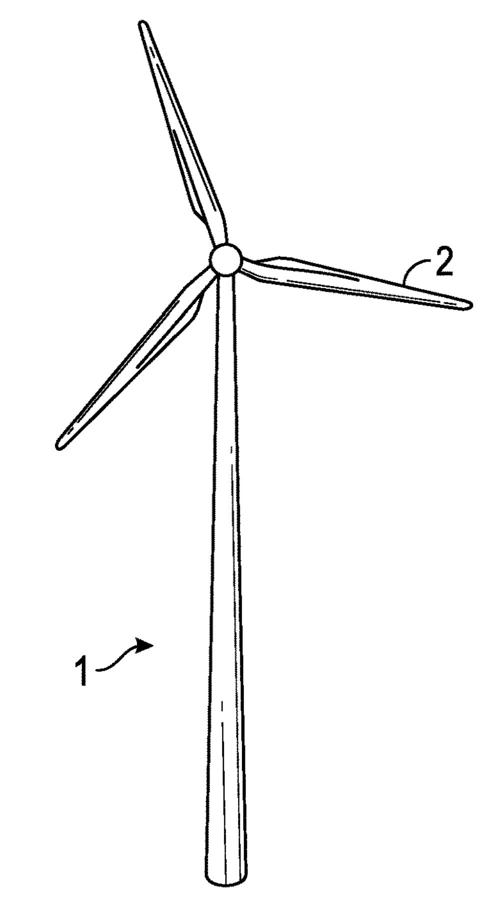
FIG. 1 is a schematic representation of an example of a wind turbine comprising wind turbine blades which are held aloft on a mast.
Figure 2:
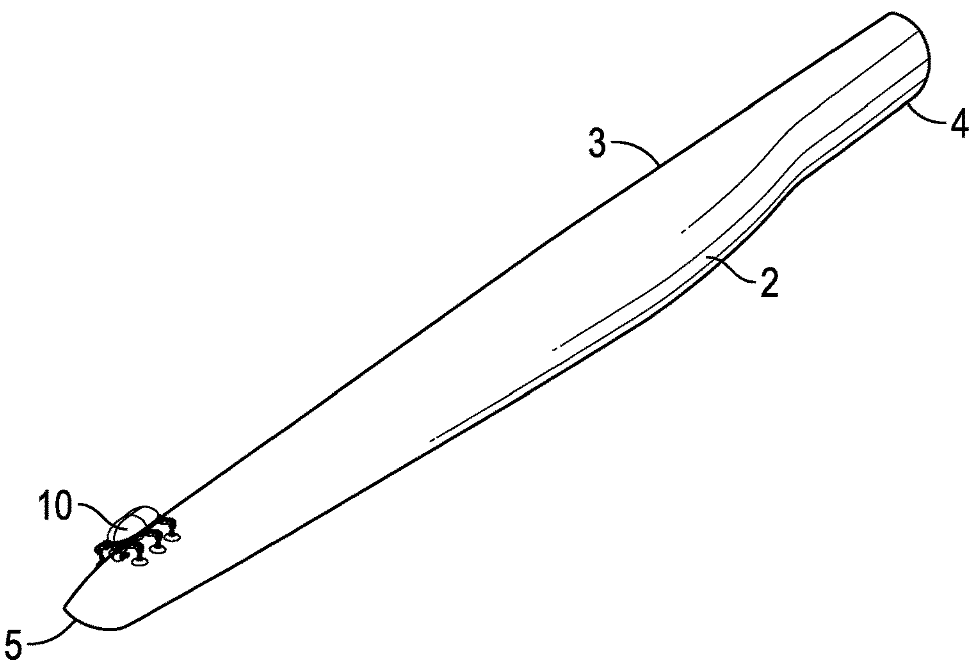
FIG. 2 is an enlargement of one of the wind turbine blades with an exemplary robotic device shown crawling along the wind turbine blade towards the tip of the blade.
Figure 3:
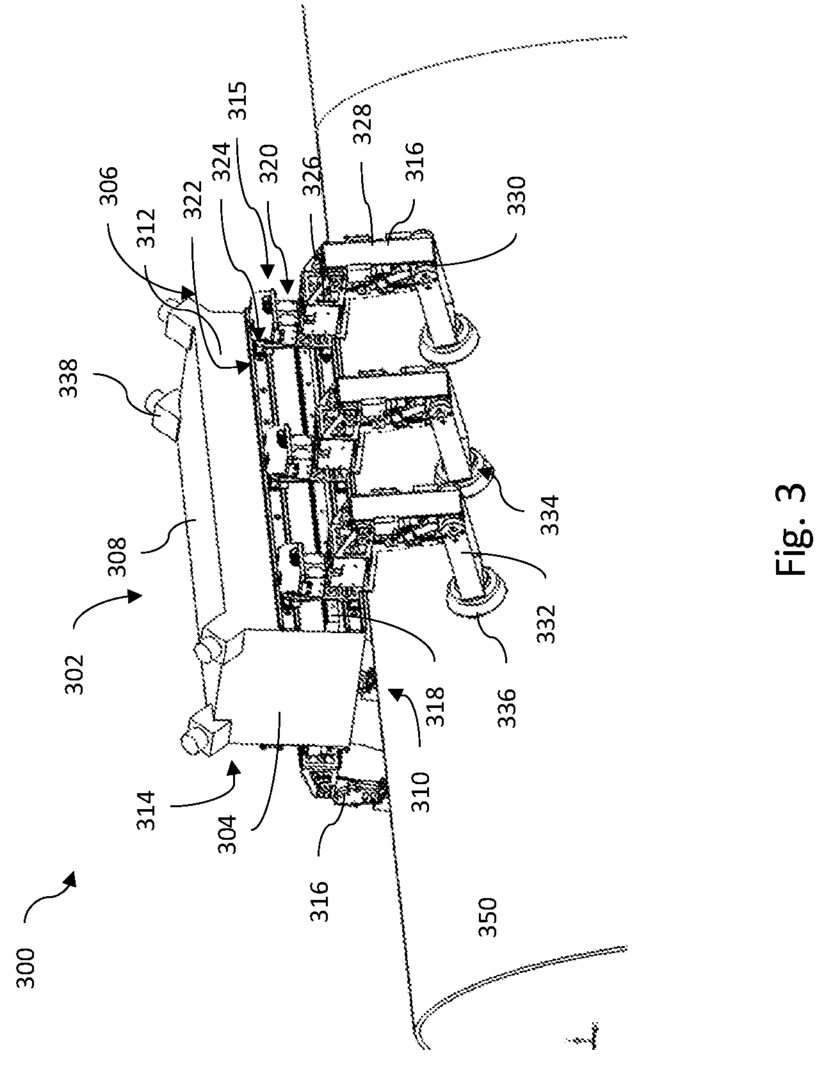
FIG. 3 shows a perspective view of a robotic device straddling a leading edge of a wind turbine.

FIG. 3 shows a perspective view of a robotic device 300. The robotic device 300 is straddling a leading edge of a wind turbine blade 350. The robotic device 300 has a body 302 which extends in a longitudinal direction. The body has a front end 304, a rear end 306, a top side 308, an underside 310, a left side 312, and a right side 314. The left side 312 and right side 314 are opposite one another. The body 302 may comprise a rectangular box-shape as shown.

Any reference herein to specific orientations and relative positions, unless otherwise stated, should be interpreted as referring to the robotic device 300 viewed standing on its legs on a horizontal surface. In use, of course, the robotic device 300 is unlikely to be walking, inspecting or maintaining on a horizontal surface and the references should be viewed accordingly; indeed many of the benefits reside in the new robotic device 300 being more able to cope with uneven, highly curved or edge profiles better than previous robotic devices. Also the robotic device 300 is not limited in terms of direction; the front end may be a rear end and the rear end a front end, depending on the task in hand and the direction of travel.

The body 302 extends in a longitudinal direction of the robotic device 300 to define a body length. In a configuration where the body 302 comprises a substantially rectangular box-shaped body as shown, the body length is represented by the length of each of the flat, longitudinally extending, left and right sides 312, 314.

The illustrated robotic device 300 is a hexapod and comprises three carriages 315 mounted to the left side 312 and three carriages 315 mounted to the right side 314. To each carriage 315, a leg is attached. Other leg and carriage configurations are possible. As shown, the legs 316 and carriages 315 may be identical in terms of their dimensions and format, the only difference being that the left legs 316 are mirror versions of the right legs 316.

The carriages 315 of the robotic device 300 are each provided with an additional linear degree of freedom to allow each leg 315 to translate along a side of the body 302 of the robotic device 300. This allows the carriage 315, independently, to translate in the longitudinal direction along one of the sides 312, 314 of the body 302. In this way, the leg separation with respect to an adjacent leg 316 or carriage 315 on a same side 312, 314 of the body 302 can be varied. This enables the robotic device 300 to walk in a different way to conventional hexapods or other similar multi-legged robots through the independent, longitudinal translation of the carriages 315 along the sides 312, 314 of the body 302, in a direction either towards or away from the ends 304, 306 of the body 302. The translation of carriages 315 in this way therefore allows the translation of legs 316 attached to said carriages 315 along the length of the body 302.

In the arrangement of FIG. 3, each leg 316 comprises a hip joint 326 (or part of a hip joint 326) where each leg connects to its respective carriage 315. Each carriage 315 is configured to translate along the side 312, 314 of the robotic device 300 on which it is mounted and is guided through interaction with a guide, for example, a rail or pair of rails 322, provided on the body 302, towards the front end 304 or rear end 306 of the body 302.

The rail or pair of rails 322 are arranged, depending on the configuration of the robotic device 300, to extend along each of the left and right sides 312,314 of the body 302, from the front end 304 to the rear end 306. They preferably extend the full body length of the robotic device 300, or as much of it as possible in order to provide as long a stride length as possible for the legs 316. The mounting of the legs 316 may also comprise more than two rails 322 on each side as desired, for example, a third or fourth rail.

The rail or rails 322 are preferably provided on (e.g., mounted on or formed as part of) each of the left and right sides 312, 314, leaving the top side 308 and underside 310 free for other components. However, it is also possible for a left hand side or right hand side rail 322 to be mounted on the top side 308 or underside 310 of the body 302 (for example, on either side of a centre line in the longitudinal direction) to guide the carriage 315 as it translates along a side of the body 302. For example, the carriage 315 may comprise a U-shaped bracket which extends from the top side 308 to the underside 310 around the left or right side 312, 314 of the body 302, to be guided by rails on the top side 308 and underside 310 as the carriage 316 translates along a side 312, 314 of the body 302. The carriage 315 could also comprise an L-shaped bracket which extends from one of the top side 308 and underside 310 to the left or right side 312, 314 of the body 302, to be guided by rails on either the top side 308 or the underside 310 and on the left or right side 312, 314 as the carriage 315 translates along a side 312, 314 of the body 302. The robotic device 300 could comprise a combination of such mounting and guiding arrangements.

The guide, which is preferably in the form of a rail or rails 322, may extend for more than 50% of the body length, preferably more than 75% of the body length, and more preferably more than 85% of the body length. In configurations like the illustrated configuration, the guides extend substantially the full body length of the robotic device 302 (i.e., between 90 to 100% of the body length), in order to allow for as much translational movement as possible.

Each carriage 315 comprises a sliding interface at one end of the carriage closest to the body 302 for coupling the carriage 315 to the guide (e.g., a rail), and an articulation at an opposite end of the carriage 315 configured to provide the hip joint 326 and to join the carriage 315 via the hip joint 326 to an upper limb segment 328 of the leg.

Thus each leg 316 is connected to the body 302 via a carriage 315 in a way that allows the movement of each leg 316 and carriage 315 to be guided as the carriage 315 translates along a side of the body 302. Each carriage 315 may also comprise an actuator of some form that is used to translate the carriage 315 with respect to the body 302.

In FIG. 3, the left side 312 and the right side 314 of the body 302 each comprise a gear rack 318. Each of the carriages 315 comprises a gear (e.g., a spur gear—not shown in FIG. 3), the teeth of which interlock with the teeth of the gear rack 318. Each carriage 315 also comprises a motor 320 configured to drive the gear. Rotation of the gear causes the gear to travel along the gear rack 318, thus causing linear translation of the carriage 315 and its respective leg 316.

This configuration, therefore, provides a linear degree of freedom to each leg 316 where the legs 316 are able to translate themselves, via the carriages 315, independently, along the sides of the body 302.

Legs 316 that are directly next to one another on the same side are considered adjacent.

The left and right sides 312, 314 comprise a guide in the form of linear rails 322 to which linear bearings 324 (e.g., wheels, ball bearings, etc.) on the end of the carriage 315 closest to the body 302 are mounted. These linear bearings 324 are able to guide and support each of the carriages 315 and allow each of the carriages 315 to translate smoothly in the longitudinal direction along the length of the body 302 independently of every other carriage 315.

Each carriage 315 or leg 316 may comprise a position locator. In FIG. 3, the motor 320 comprises a position locator in the form of an encoder so that the position of each carriage 315 or leg 316 along the length of the body 302 is known and can be controlled. The robotic device 300 also comprises limit switches to prevent adjacent carriages 315 or legs 316 from colliding with one another when moving linearly. The limit switches may also be configured to determine the position of each of the carriages 315 or the legs 316 relative to the body 302 and/or relative to other carriages 315 or legs 316.

Each leg 316 may comprise at least an upper articulated joint 326 (hip joint, or coxa), an upper articulated limb 328 (upper limb segment), a lower articulated joint 330 (knee), a lower articulated limb 332 (lower limb segment), an ankle joint 334, and a foot 336. The foot 336 is connected to the lower articulated limb 332 by the ankle joint 334 and the lower articulated limb 332 is connected to the upper articulated limb 328 by the lower articulated joint 330. The upper articulated limb 328 is connected to the carriage 315 by the upper articulated joint 326. The upper articulated joint 326 can also house the motor 320 and linear bearings 324 which couple each leg 316 to the body 302.

The body 302 in FIG. 3 further comprises four sensors 338, where two sensors 338 are positioned on the edge where the front end 304 and the top side 308 meet (e.g., at the upper corners of the body 302 looking forward) and two sensors 338 are positioned on the edge where the rear end 306 and the top side 308 meet (e.g., at the other upper corners of the body 302 looking rearwards). These sensors 338 comprise cameras and other sensors, and are configured to provide navigational aid to the robotic device 300. The sensors 338 are also configured to scan the surface of the structure over which the robotic device 300 is moving. The sensors 338 may provide a controller with information to help the placement of the foot 336 of each leg 316.

Figure 4:
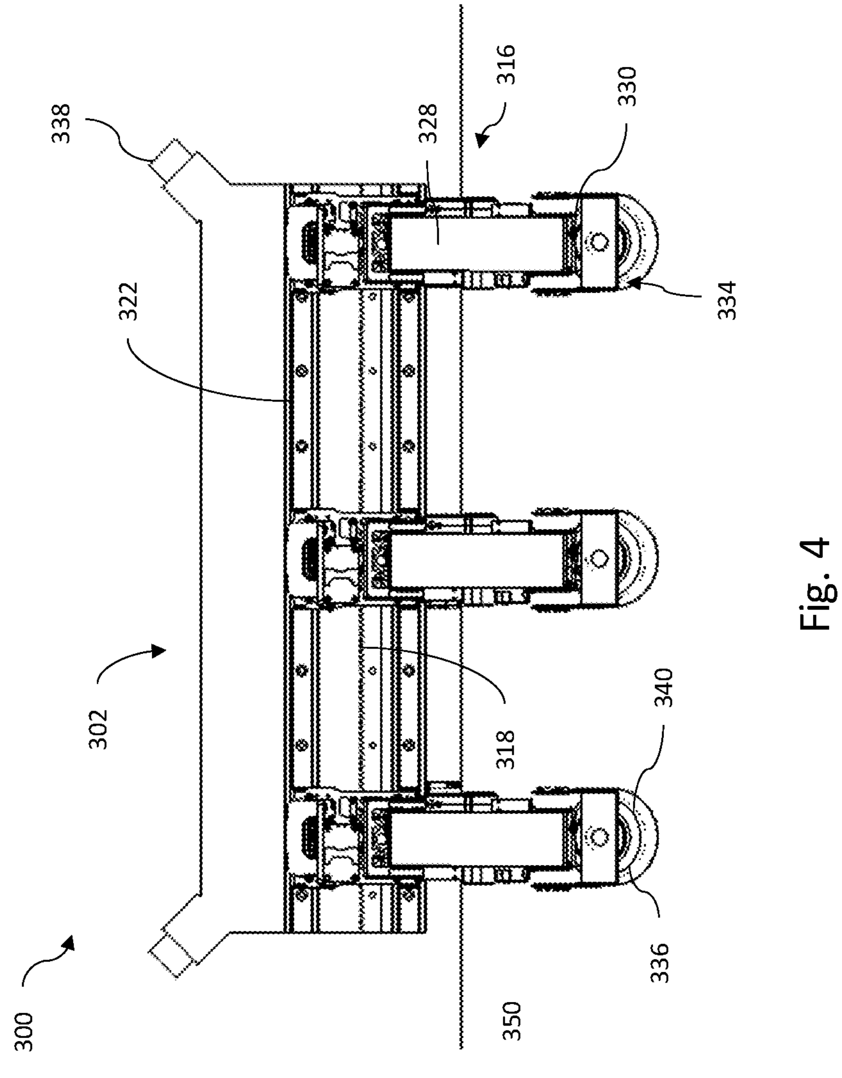
FIG. 4 shows a side view of a robotic device.

FIG. 4 shows a side view of the robotic device 300. The left side 312 and the right side 314 are substantially symmetrical in their arrangements.

The foot 336 of each leg 316 comprises a suction device for securing the robotic device 300 to the surface of the wind turbine blade 350. The foot 336 of each leg 316 comprises a suction cup 340. The suction cups 340 depicted in FIG. 4 are in the form of concave suction cups 340, for example, having a radius to height ratio of greater than one. The suction cups 340 may be made of a polymer-based material to provide compliance.

Each leg 316 comprises a suction generating device to generate suction within the suction cup 340. The suction generating device may comprise a piston to increase the internal volume of the suction cup 340 and thereby lower the pressure within to create suction against the surface. The suction generating device may comprise a servo motor, and a hydraulic actuator or a pneumatic actuator. These parts may be housed within a framework (skeleton) forming the outer surface of the lower limb segment 332.

Each of the legs 316 have three rotational degrees of freedom. For the robotic device 300 depicted here, the upper articulated joint 326 (hip joint) may be configured to provide three rotational degrees of freedom to the rest of the leg 316. The lower articulated joint 330 (knee joint) is configured to provide at least one rotational degree of freedom to the lower articulated limb 332 relative to the upper articulated limb 328.

The ankle joint 334 may be configured to provide three degrees of movement to the foot 336 relative to the lower articulated limb 332. That is, the ankle joint provides axial and rotational movement of the foot 336 relative to the rest of the leg 316. This enables the foot 336 to allow twisting movements of the leg 316 relative to the plane of the surface. An advantage of providing axial movement of the foot relative to the leg is that the foot may rest on the surface of the wind turbine blade (and fix itself firmly to the surface) in a substantially perpendicular manner and can help to allow rotation to enable the leg and body of the robot to move where necessary whilst the foot remains stationary and fixed to the blade.

Each of the legs 316 comprise power units for supplying electricity to components in the legs 316. The legs 316 also comprise cabling running through cavities in each of the articulated limbs 328, 332 and through the upper and lower articulated joints 326, 330.

The legs 316 may be modular standalone units that are detachable from the body 302. This can have benefits in terms of the robotic device 300 still being able to move and perform actions with the remaining legs 316 in the event that there is an operational problem. It also allows for easier maintenance or replacement.

Figure 5:
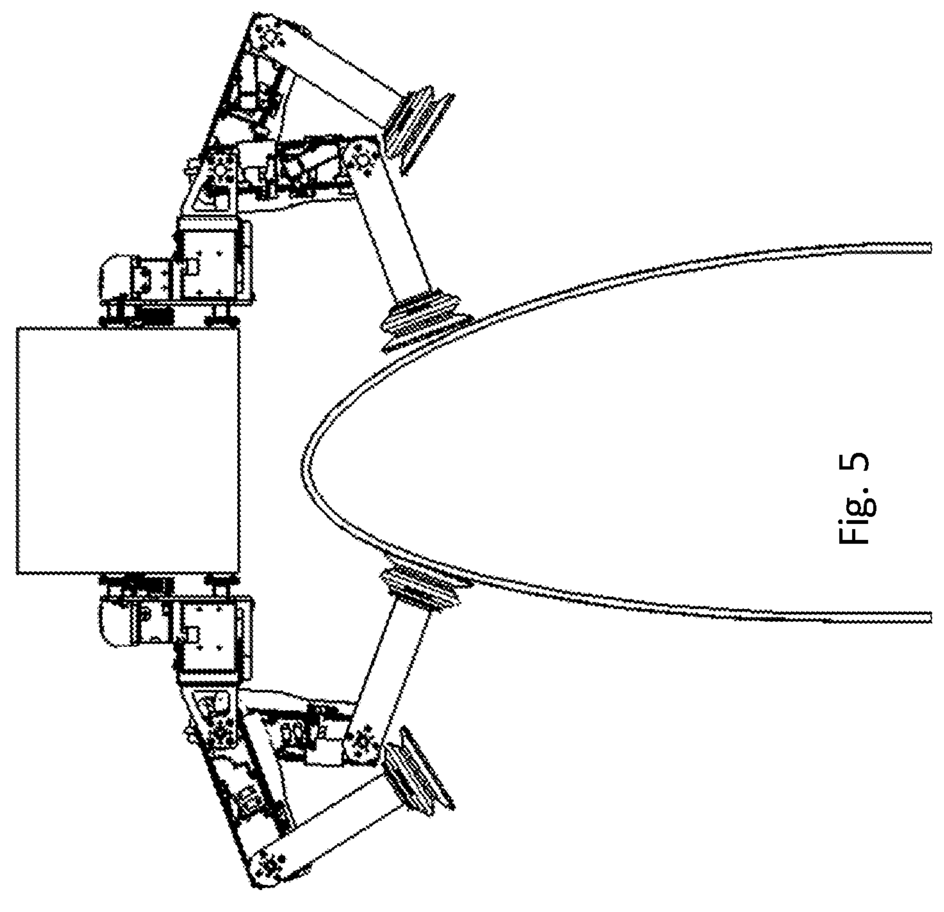
FIG. 5 shows a front view of a robotic device with some legs raised in an up position.

FIG. 5 shows a front view of a robotic device 400 with some legs 402 raised in an up position. The robotic device 400 is straddling a leading edge of a wind turbine blade 450. The robotic device 400 has many features in common with the robotic device 300 described above, and thus discussion of the features above applies equally to this embodiment. The high degree of convex curvature at the leading edge of the wind turbine blade and the relative scale of the robotic device to the width of the wind turbine blade (the width being on a similar scale to the width of the straddling robotic device 300 taken between corresponding hip joints) means that the feet of the robotic device 300 may be arranged facing one another or substantially facing one another (e.g., between 90-180 degrees). A similar situation would arise if instead of the wind turbine blade, the robotic device 300 was straddling a beam, an edge of a floor or plate, or a post. In that scenario, the feet would rest on two parallel, planar surfaces arranged on opposite sides of the structure. Other scenarios are possible where the two surfaces are not parallel (e.g., surfaces are up to ±30° of the other) or planar (such surfaces may include some roughness or undulations of, say, up to 10 mm from a base level).

FIGS. 6 to 22 show key steps for methods of locomotion of the robotic devices 300, 400 described above. The robotic device 300, 400 is configured to traverse a variety of surfaces and surface shapes, as indicated above. The linear degree of freedom offers additional options for methods of traversing surfaces.

FIGS. 6 to 14 show steps of a method of locomotion relating to a tripod method of movement for a robotic device 500. The tripod method of locomotion for the robotic device 500 comprises a number of steps.

Figure 6:
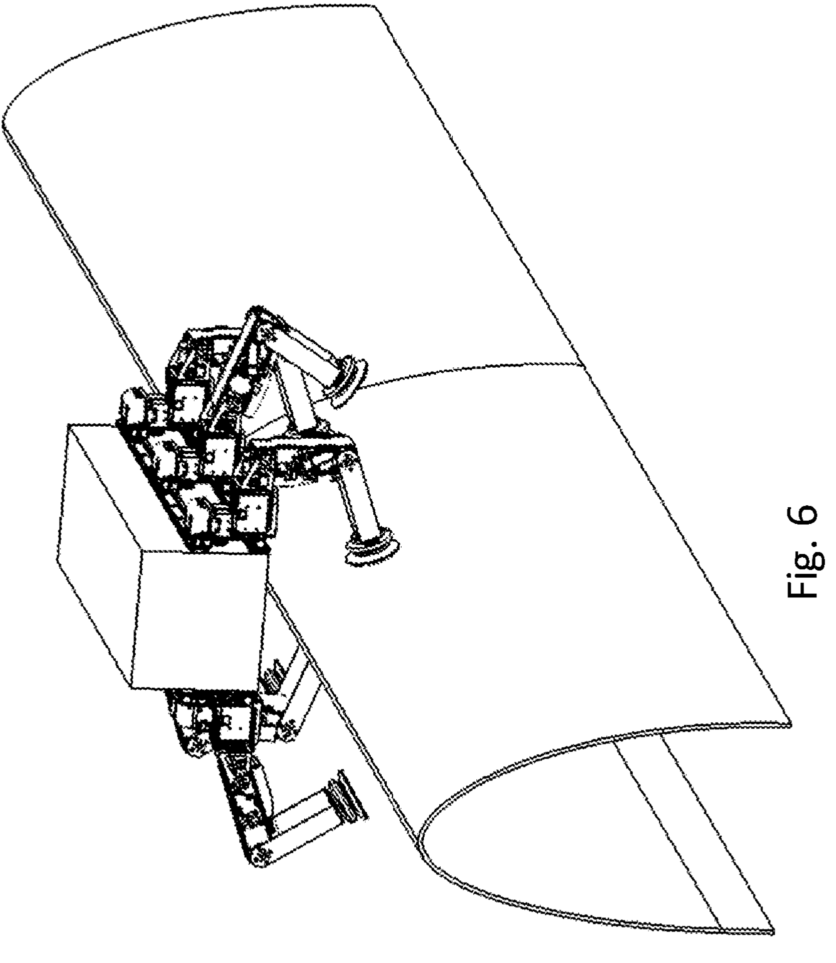
FIG. 6 shows a perspective view of a robotic device with some legs raised in an up position.

The first step is shown in FIG. 6 and comprises raising a first set of legs 502 from a surface 550 into an up position. That is, the first set of legs 502 are raised so that the feet 504 of the first set of legs 502 are no longer in contact with the surface 550. The legs not in the first set of legs 502 remain in a down position with the feet attached to the surface 550 to provide stability to the robotic device 500.

The first set of legs 502 comprises a left leg 506 of a first pair of legs 508, a right leg 510 of a second pair of legs 512, and a left leg 514 of a third pair of legs 516. The first pair of legs 508 is adjacent to the second pair of legs 512 and the third pair of legs 516 is also adjacent to the second pair of legs 512, but the first pair of legs 508 is not adjacent to the third pair of legs 516. Therefore, the second pair of legs 512 is positioned between the first pair of legs 508 and the third pair of legs 516.

Figure 7:
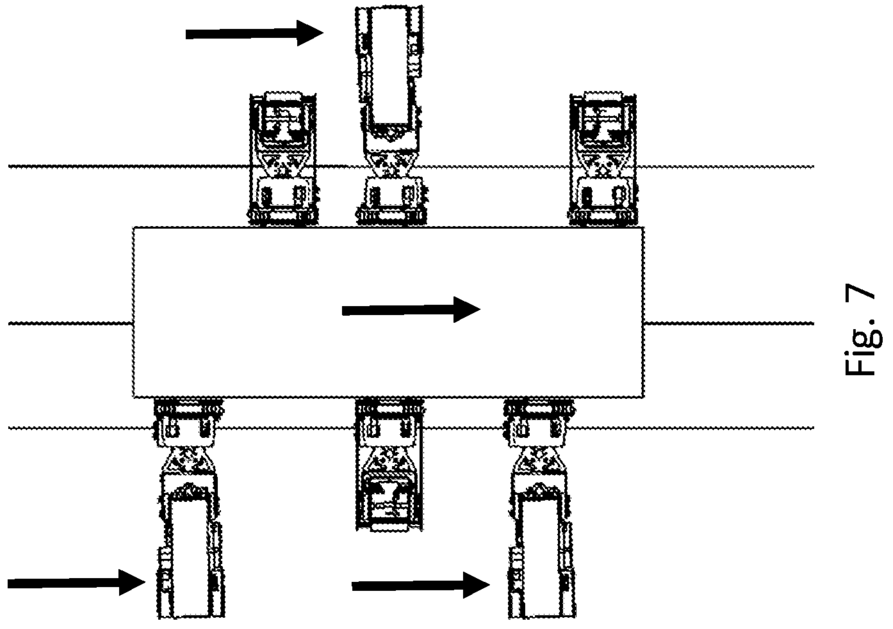
FIG. 7 shows a top view of a robotic device moving in a longitudinal direction.
Figure 8:
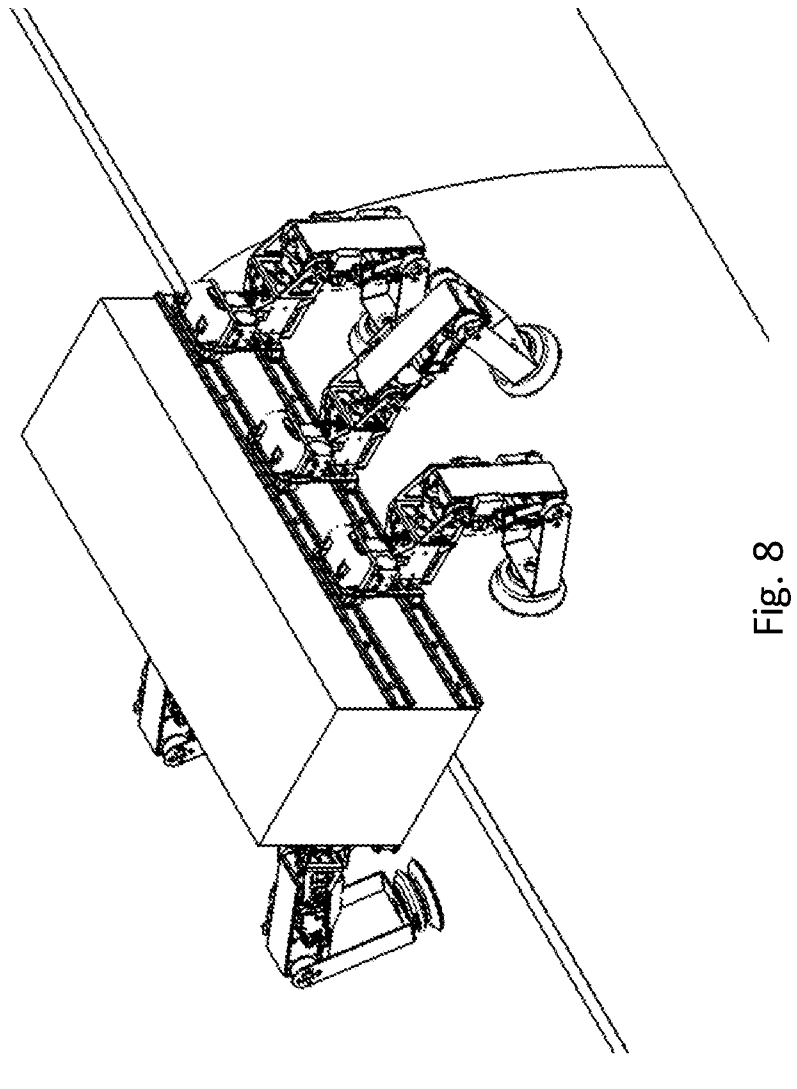
FIG. 8 shows a perspective view of the robotic device in FIG. 7.

FIGS. 7 and 8 show a second step of moving the first set of legs 502 in a longitudinal direction by translating the carriages of each leg in the first set of legs 502. In this step, the body 518 is also configured to move with the first set of legs 502 in the same longitudinal direction as the first set of legs 502.

To move the body 518 relative to the legs, each of the legs secured to the surface 550 are configured to rotate their gears so as to move the body 518 in a linear direction relative to the fixed legs.

Each of the carriages 315 may be able to translate more than 50% of the body length, preferably more than 60% of the body length. Preferably each carriage 315 is capable of moving more than 70% of the body length.

The first set of legs 502 is configured to move linearly relative to the body 518 simultaneously to the linear movement of the body 518 relative to the fixed legs. In this way, the robotic device 500 is capable of covering a significant distance along a portion of the surface 550.

A third step, not depicted, is lowering the first set of legs 502 into a down position on to the surface 550. That is, once the first set of legs 502 and the body 518 have completed their movements in the second step, the first set of legs 502 lower their feet 504 to the surface 550 so that the first set of legs 502 are secured to the surface 550.

Figure 9:
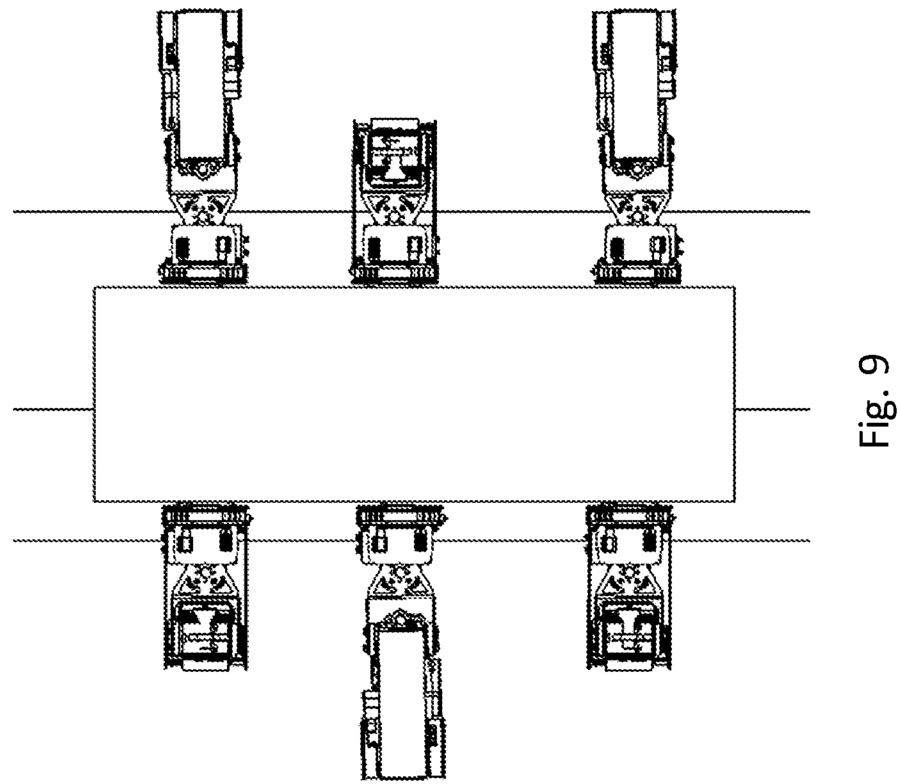
FIG. 9 shows a top view of a robotic device with some legs in an up position.

FIGS. 8 and 9 show a fourth step of raising a second set of legs 520 from the surface 550 into the up position. The second set of legs 520 comprise the legs that were not in the first set of legs 502. That is, the second set of legs 520 are raised so that the feet 522 of the second set of legs 520 are no longer in contact with the surface 550. The first set of legs 502 remain in a down position with the feet 504 attached to the surface 550 to provide stability to the robotic device 500.

The second set of legs 520 comprises a right leg 524 of the first pair of legs 508, a left leg 526 of the second pair of legs 512, and a right leg 528 of the third pair of legs 516.

Figure 10:
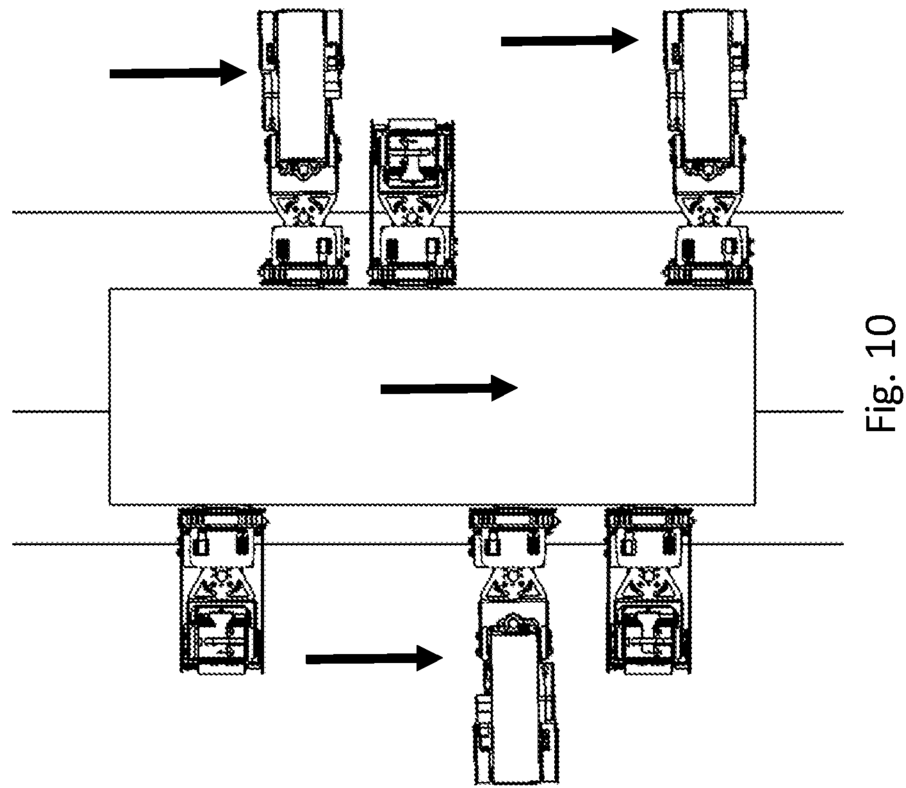
FIG. 10 shows a top view of a robotic device moving in a longitudinal direction.
Figure 11:
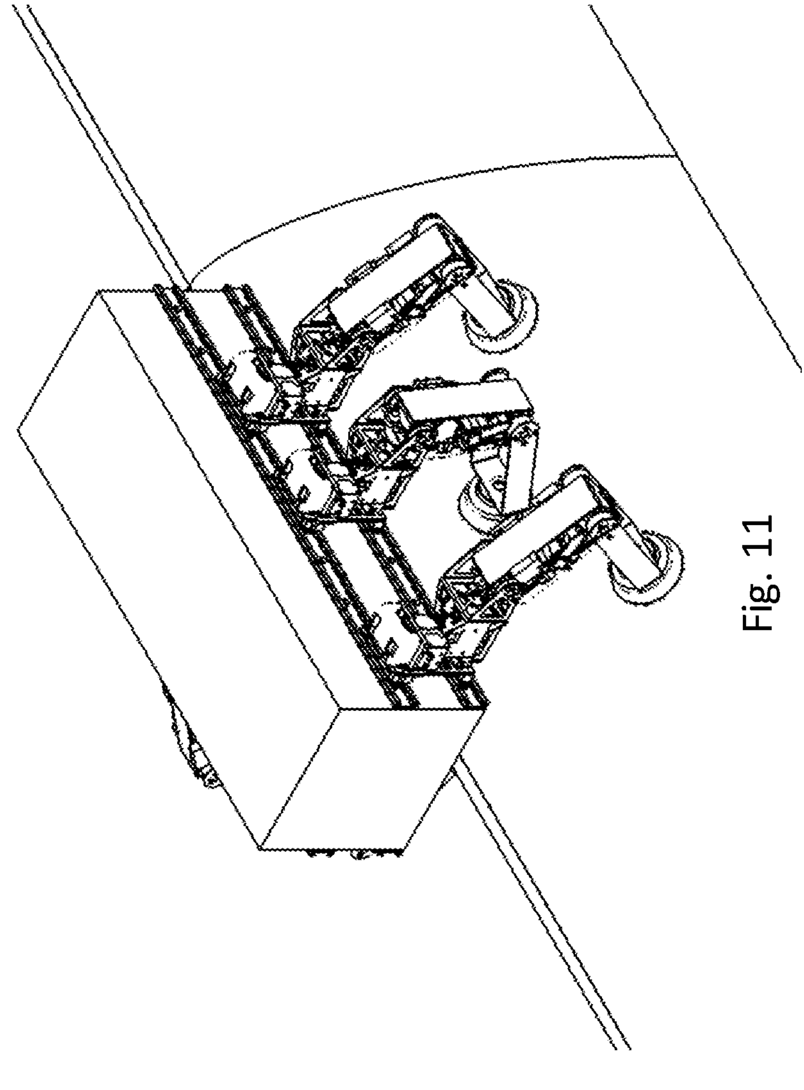
FIG. 11 shows a perspective view of the robotic device in FIG. 10.

FIGS. 10 and 11 show a fifth step of moving the second set of legs 520 in the longitudinal direction by translating the carriages of each leg in the first set of legs 520. In this step, the body 518 is also configured to move with the second set of legs 520 in the same longitudinal direction as the second set of legs 520.

A sixth step, not depicted, is lowering the second set of legs 520 into a down position on to the surface 550. That is, once the second set of legs 520 and the body 518 have completed their movements in the second step, the second set of legs 520 lower their feet 522 to the surface 550 so that the second set of legs 520 are secured to the surface 550.

The above steps are repeated to travel across surfaces. The robotic device 500 is configured to adapt to the shape of the surfaces it traverses, moving the legs through appropriate angles to ensure that the robotic device 500 is secure in its movements.

Figure 12:
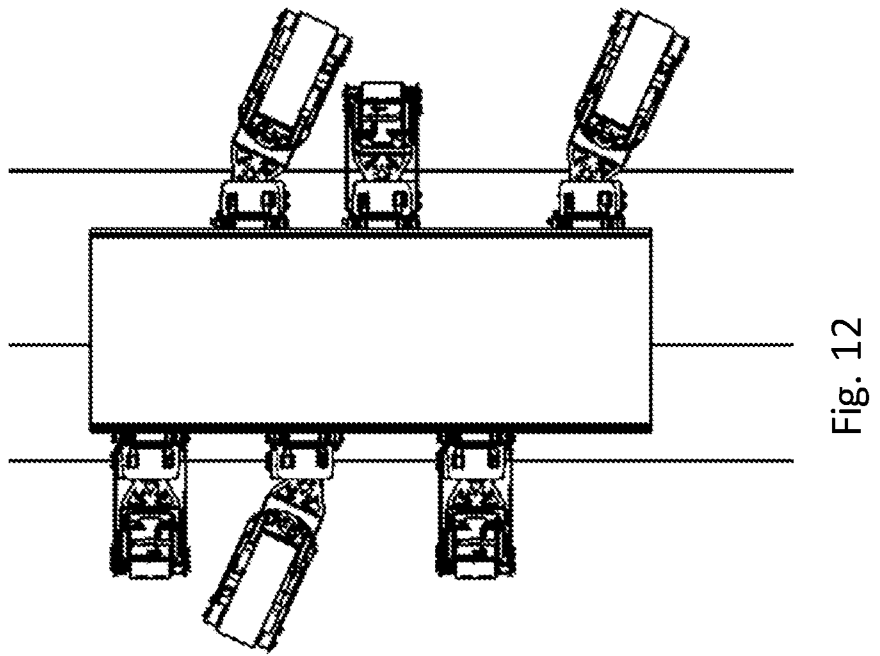
FIG. 12 shows a top view of a robotic device moving in a longitudinal direction.

FIG. 12 depicts a modification of the fifth step described above. In this Figure, the second set of legs 520 are also configured to rotate at the upper articulated joints of each leg. That is, each leg of the second set 520 is configured to rotate relative to the body 518. This rotation in addition to the lateral movement provides additional reach to the legs, allowing the robotic device 500 to travel even further across a surface 550.

The first set of legs 502 may similarly rotate in the second step in order to provide additional reach to the robotic device 500. The rotation of the upper articulated joints in either the first set of legs 502 or the second set of legs 520 is not restricted to the second and fifth steps. That is, the legs may rotate during any movement steps.

Figure 13:
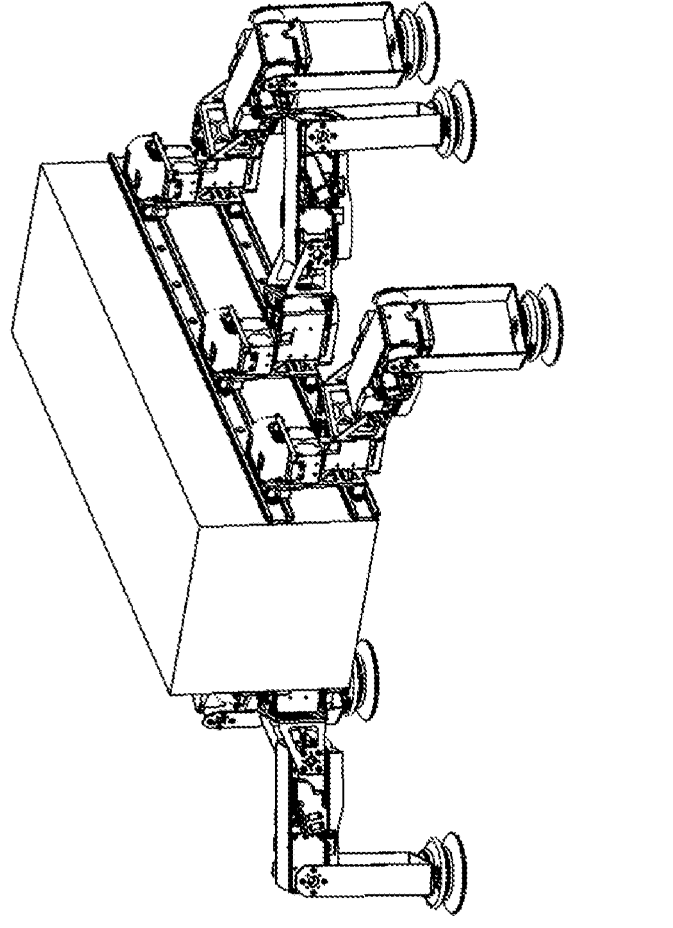
FIG. 13 shows a perspective view of a robotic device moving across a flat surface.
Figure 14:
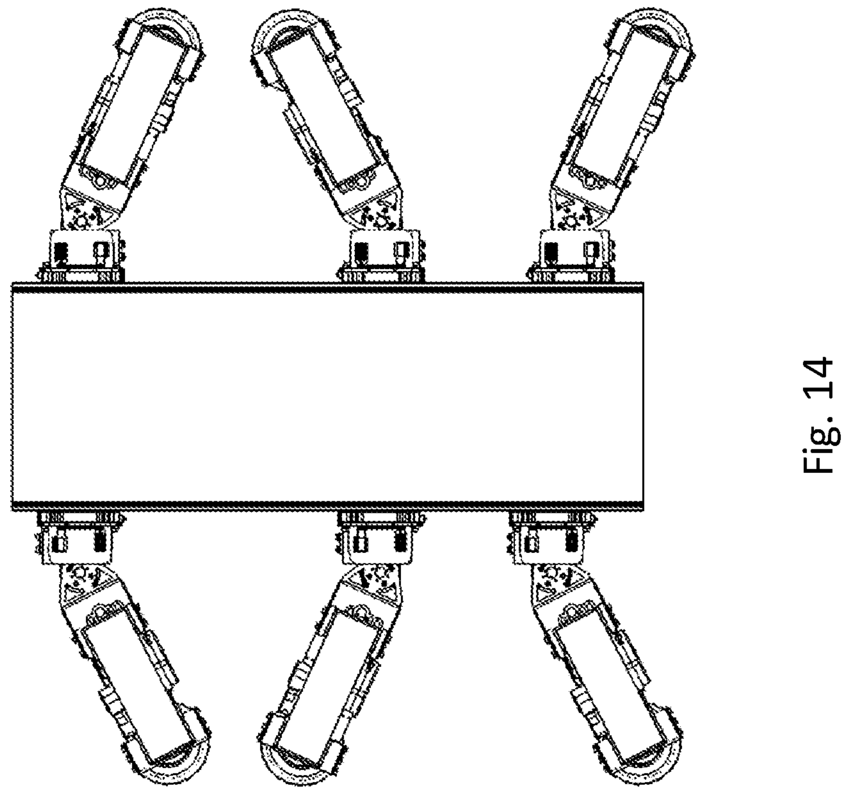
FIG. 14 shows a top view of the robotic device in FIG. 13.

FIGS. 13 and 14 depict the robotic device 500 in a configuration for traversing a substantially flat surface using the tripod method described above.

FIGS. 15 to 22 show steps of a method of locomotion relating to a ripple method of movement. The ripple method of locomotion for the robotic device 500 comprises a number of steps. The reference numerals used in these features may refer to the same features as those referenced above.

Figure 15:
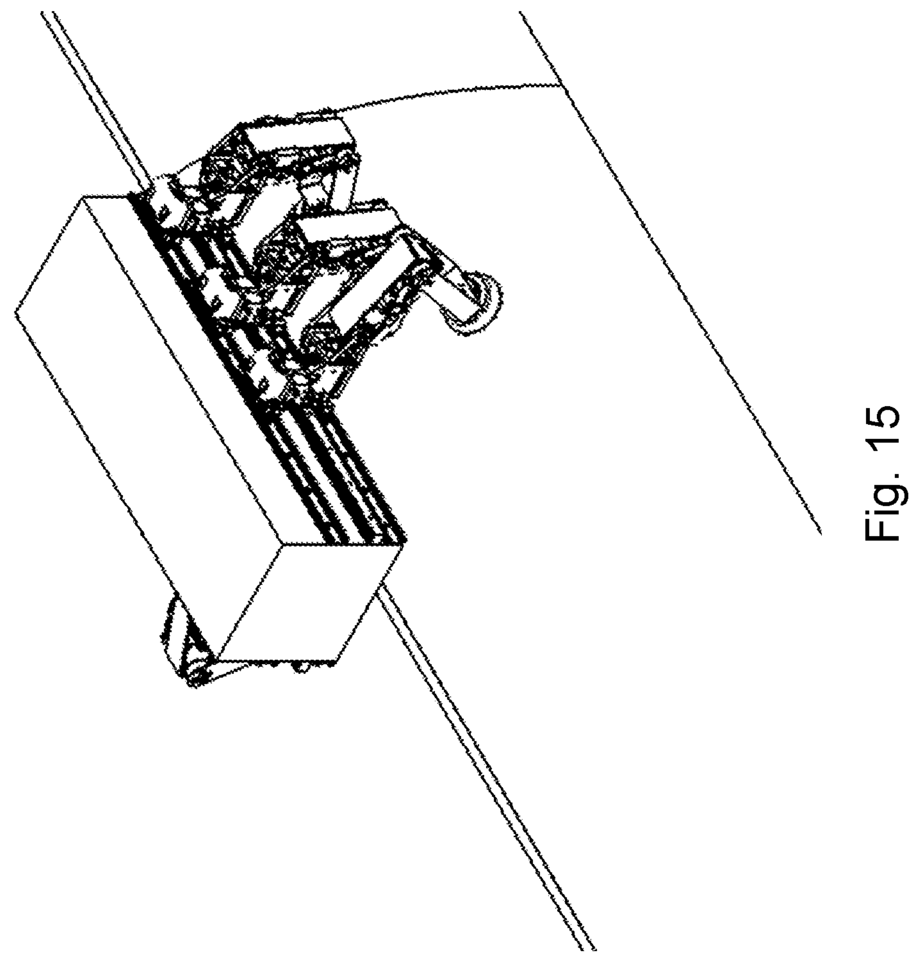
FIG. 15 shows a perspective view of a robotic device with a first pair of legs raised in an up position.

A first step, shown in FIG. 15, comprises raising the first pair of legs 508 from a surface 550 into an up position.

Figure 16:
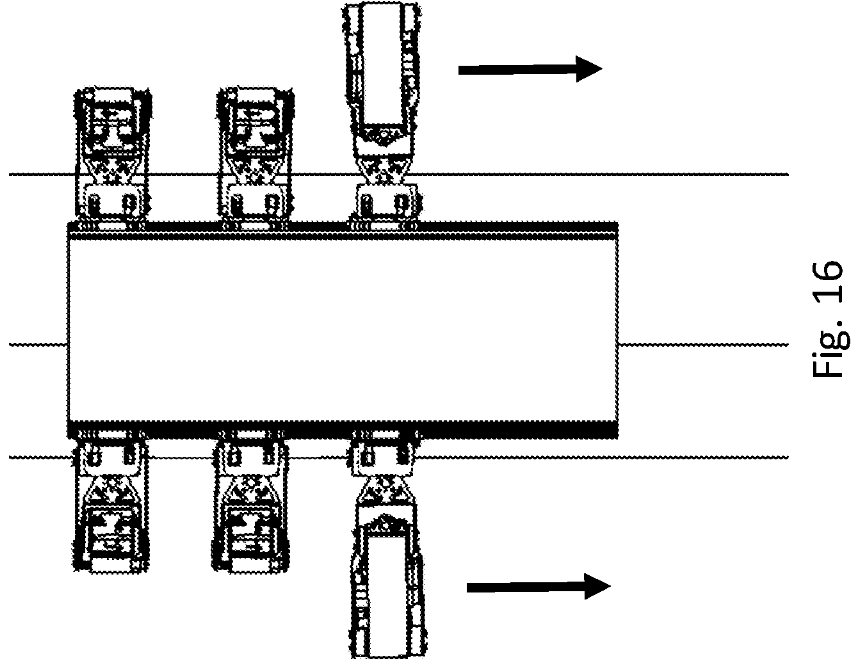
FIG. 16 shows a top view of the first pair of legs of the robotic device moving in a longitudinal direction.

FIG. 16 shows a second step of moving the first pair of legs 508 in a longitudinal direction by translating the carriages of each leg in the first pair of legs 508.

A third step comprises lowering the first pair of legs 508 into a down position on to the surface 550.

Figure 17:
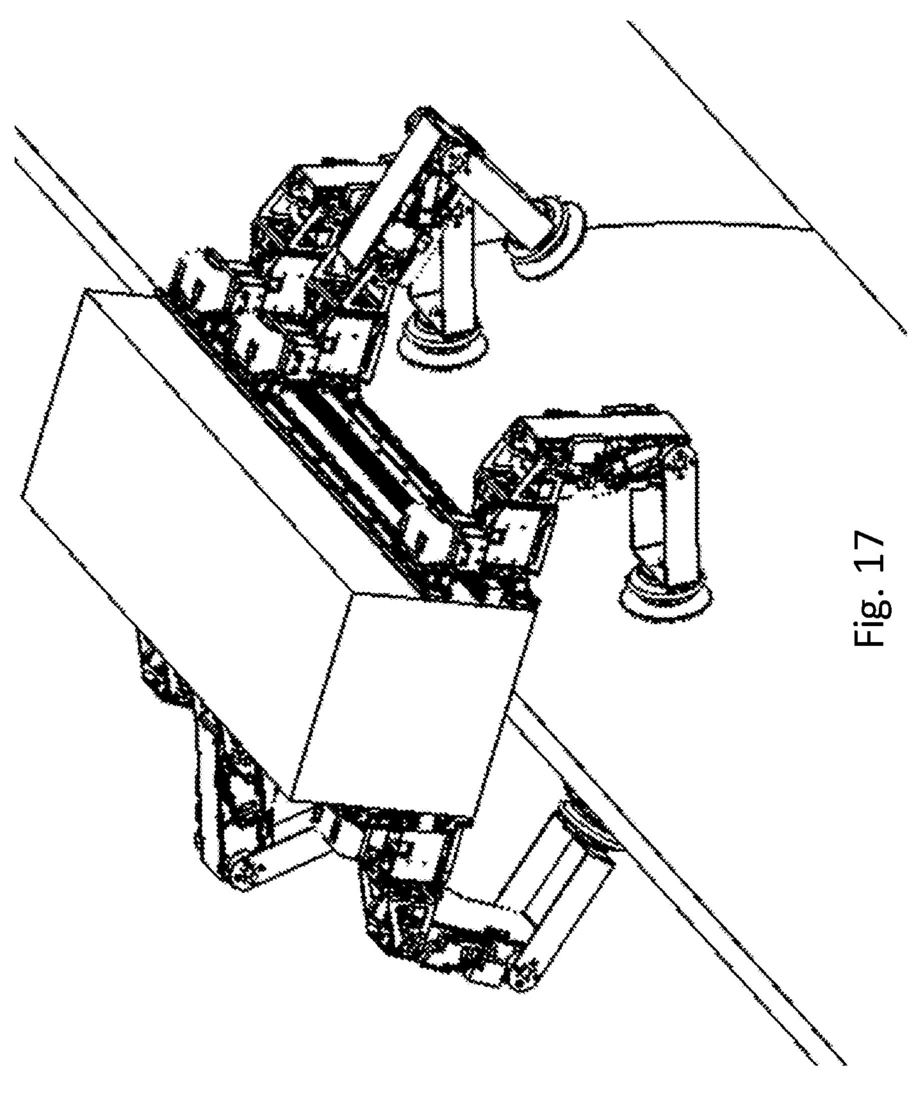
FIG. 17 shows a perspective view of a robotic device a robotic device with a second pair of legs raised in an up position.

A fourth step, shown in FIG. 17, comprises raising the second pair of legs 512 from the surface 550 into the up position.

Figure 18:
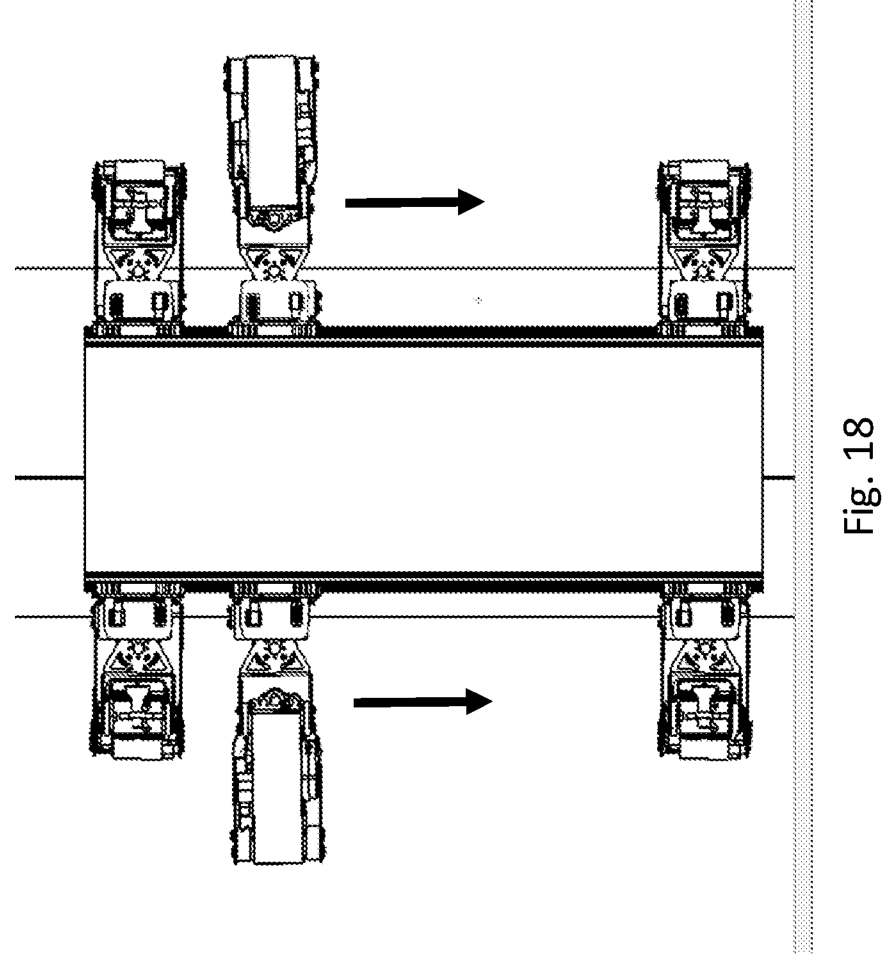
FIG. 18 shows a top view of the second pair of legs of the robotic device moving in a longitudinal direction.

FIG. 18 shows a fifth step of moving the second pair of legs 512 in a longitudinal direction towards the first set of legs 508 by translating the carriages of each leg in the second pair of legs 512.

A sixth step comprises lowering the second pair of legs 512 into the down position on to the surface 550.

A seventh step comprises raising the third pair of legs 516 from the surface 550 into the up position.

Figure 19:
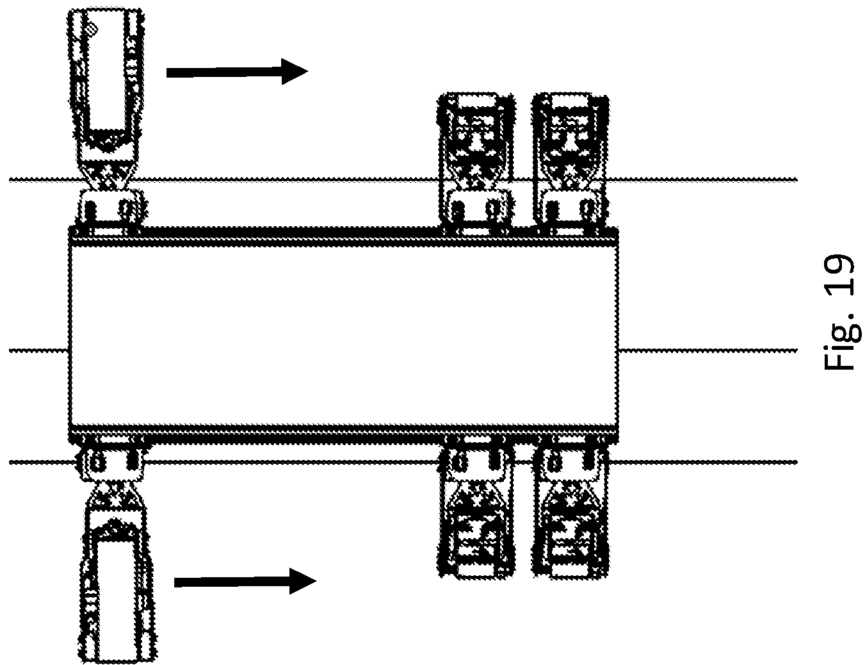
FIG. 19 shows a top view of a third pair of legs of the robotic device moving in a longitudinal direction.

FIG. 19 shows an eighth step of moving the third pair of legs 516 in a longitudinal direction towards the second set of legs 512 by translating the carriages of each leg in the third pair of legs 516.

Figure 20:
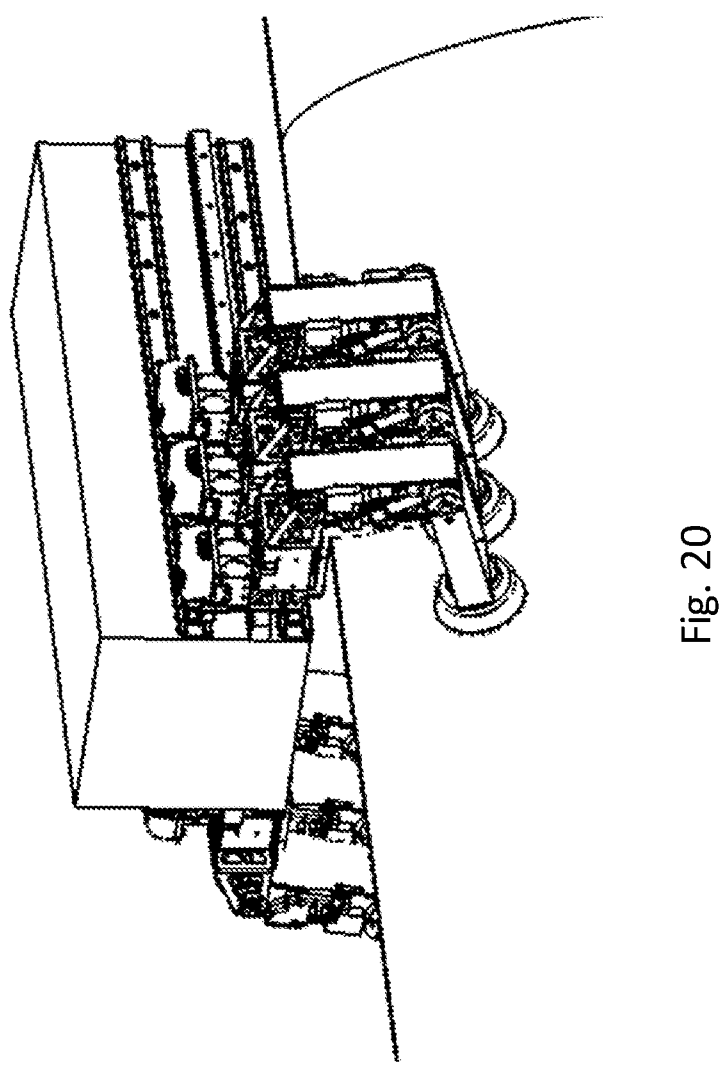
FIG. 20 shows a perspective view of the robotic device once the third pair of legs have completed their movements.

A ninth step, depicted in FIG. 20, comprises lowering the third pair of legs 516 into the down position on to the surface 550.

Figure 21:
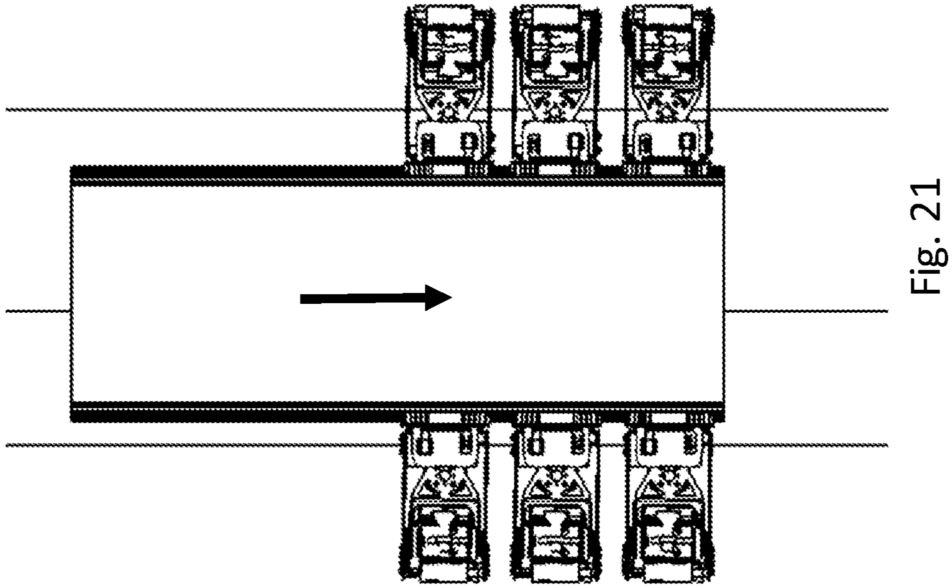
FIG. 21 shows a top view of the body of the robotic device moving in a longitudinal direction.
Figure 22:
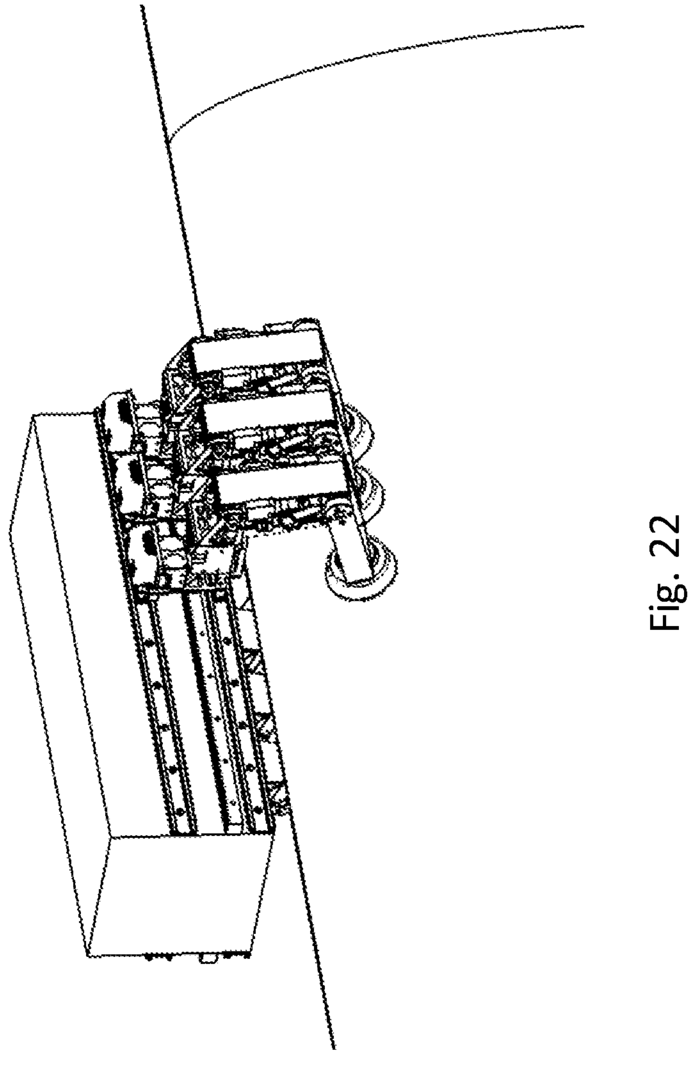
FIG. 22 shows a perspective view of the robotic device after the movement step shown in FIG. 21.

A tenth step, shown in FIG. 21, comprises moving the body 518 in the longitudinal direction. In this way, the robotic device 500 arrives in the position shown in FIG. 22, which is the same as the position in which it started.

Thus as shown from the above exemplary embodiments, the present invention can also be seen to provide a multi-legged robotic device where the robotic device has been adapted to provide an additional linear degree of freedom to each leg to allow each leg to translate in a longitudinal direction relative to sides of a body of the robotic device independently of the other legs to vary a leg separation with respect to an adjacent leg on a same side of the body. The legs may comprise a hip joint and variation of the leg separation may be a result of translating the hip joint of a leg with respect to an adjacent leg. Translation of the hip joint may be achieved through translation of a carriage with respect to the body of the robotic device, the carriage being arranged to carry the hip joint and the leg as the leg translates along a side of the body.

The invention claimed is:

1. A robotic device for inspecting structures, comprising:

a body extending in a longitudinal direction of the robotic device, the body having a front end, a rear end, and opposing sides extending between the front end and the rear end, and a body length;

a plurality of legs arranged on each of the opposed sides of the body, each leg comprising one or more joints, wherein the plurality of legs is arranged as one or more pairs of legs, and wherein one leg of a pair of legs is arranged on an opposite side of the body widthways to the other; and a plurality of carriages, each carriage connecting a leg to the body and being configured to allow each leg to translate in a longitudinal direction relative to the sides of the body, wherein any one of the plurality of carriages is configured to translate 60% or more of the body length of the robotic device, and wherein each of the carriages is configured to move independently of each of the other carriages such that a leg separation may be varied, the leg separation being the distance between any two adjacent legs on one side of the body, and wherein the carriage of the one leg of a pair legs is configured to move independently of the carriage of the leg on the other side of the body.

2. The robotic device of claim 1, wherein each leg comprises one or more rotational degrees of freedom.

3. The robotic device of claim 1 wherein each of the legs comprises a first part of a hip joint where each leg connects to each respective carriage, and wherein the body further comprises a guide, each of the plurality carriages being connected to the guide such that the carriage is configured to translate along the side of the robotic device, guided through interaction with the guide, towards the front end or rear end of the body.

4. The robotic device of claim 3, wherein each carriage comprises a sliding interface configured to couple the carriage to the guide, and wherein the carriage further comprises an articulation configured to provide a second part of the hip joint and join the carriage via the hip joint to an upper limb segment of the leg.

5. The robotic device of claim 3, wherein the body comprises a left-hand guide associated with a left side of the body and a right-hand guide associated with a right side of the body, wherein each guide comprises a rail, which extends in the longitudinal direction along the body, the plurality of legs on a given side of the body being connected to the rail to guide the movement of each leg as the leg translates along a side of the body.

6. The robotic device of claim 5, wherein the rail or rails on each side of the body are linear or near linear.

7. The robotic device of claim 5, wherein the left side and the right side are flat sides and the guides are provided on and extend along the flat left and right sides of the body.

8. The robotic device of claim 5, wherein the left side and the right side are curved sides and the guides are provided on and extend along the curved left and right sides of the body.

9. The robotic device of claim 4, wherein each leg further comprises a lower limb segment, wherein the lower limb segment is connected to the upper limb segment by a lower articulation.

10. The robotic device of claim 9, wherein a foot is connected to the lower limb segment of the leg by an ankle joint allowing rotational movement of the foot relative to the lower limb segment and linear movement of the foot relative to the lower limb segment.

11. The robotic device of claim 10, further comprising a controller configured to control the position of the body relative to each foot when each foot is positioned on a surface.

12. The robotic device of claim 1, wherein the robotic device further comprises limit switches configured to prevent collisions between adjacent carriages and/or legs.

13. The robotic device of claim 1, wherein the robotic device comprises a hexapod and each leg is able to translate at a hip joint with respect to the body of the robotic device in the longitudinal direction of the body.

14. The robotic device of claim 1, wherein each leg comprises utilities for control and operation of the leg, wherein the utilities include power, pneumatics, and/or hydraulics.

15. The robotic device of claim 14, wherein cabling for the utilities is housed in one or more cavities within the leg.

16. A method of locomotion for the robotic device as claimed in claim 1, comprising:

raising and lowering legs from and to a surface in a stepwise motion to move the body of the robotic device with respect to a structure, wherein the method of locomotion further includes translating each leg in a longitudinal direction along a side of the body when each leg is in a raised position.

17. A method of locomotion as claimed in claim 16, comprising:

raising a first set of legs from the surface into an up position, the first set of legs comprising a left leg of a first pair of legs and a right leg of a second pair of legs, wherein the first pair of legs is adjacent to the second pair of legs;

translating the first set of legs in the longitudinal direction;

translating, with the first set of legs, the body in the longitudinal direction;

lowering the first set of legs into a down position on the surface;

raising a second set of legs from the surface into the up position, the second set of legs comprising a right leg of the first pair of legs and a left leg of the second pair of legs;

translating the second set of legs in the longitudinal direction;

translating, with the second set of legs, the body in the longitudinal direction;

lowering the second set of legs into the down position on the surface.

18. The method of claim 17, further comprising:

rotating at least one of the first or second sets of legs relative to the body.

19. A method of locomotion as claimed in claim 16, comprising:

raising a first pair of legs from the surface into an up position;

moving the first pair of legs in the longitudinal direction;

lowering the first pair of legs into a down position on the surface;

raising a second pair of legs from the surface into the up position, wherein the second pair of legs is adjacent to the first pair of legs;

moving the second pair of legs in the longitudinal direction;

lowering the second pair of legs into the down position on the surface;

moving the body in the longitudinal direction.

20. The robotic device of claim 14, wherein each leg comprises a suction generating device for generating suction in a suction cup and/or a power source.

* * * * *